US012028562B2

(12) United States Patent
Kitazato

(10) Patent No.: US 12,028,562 B2
(45) Date of Patent: *Jul. 2, 2024

(54) TRANSMISSION DEVICE, TRANSMISSION METHOD, RECEPTION DEVICE, AND RECEPTION METHOD

(71) Applicant: SATURN LICENSING LLC, New York, NY (US)

(72) Inventor: Naohisa Kitazato, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,182

(22) Filed: Nov. 11, 2022

(65) Prior Publication Data
US 2023/0188767 A1 Jun. 15, 2023

Related U.S. Application Data

(60) Continuation of application No. 17/074,469, filed on Oct. 19, 2020, now Pat. No. 11,523,154, which is a (Continued)

(30) Foreign Application Priority Data

Jul. 10, 2014 (JP) ................................. 2014-142113

(51) Int. Cl.
H04N 21/236 (2011.01)
H04H 20/42 (2008.01)
(Continued)

(52) U.S. Cl.
CPC .......... *H04N 21/236* (2013.01); *H04H 20/42* (2013.01); *H04N 21/23614* (2013.01); (Continued)

(58) Field of Classification Search
CPC ............... H04N 21/236; H04N 21/435; H04N 7/17318; H04N 7/165; H04N 7/173
See application file for complete search history.

(56) References Cited

U.S. PATENT DOCUMENTS

2013/0081088 A1* 3/2013 Hwang .................. H04H 20/24 725/59
2013/0094563 A1 4/2013 Bae
(Continued)

FOREIGN PATENT DOCUMENTS

EP 2 849 440 A1 3/2015
JP 2013-153291 8/2013
(Continued)

OTHER PUBLICATIONS

"Information technology—High efficiency coding and media delivery in heterogeneous environments Part 1: MPEG media transport (MMT)", ISO/IEC JTC 1/SC 29/WG 11, ISO/IEC DIS 23008-1, Apr. 26, 2013, 90 pages.

(Continued)

*Primary Examiner* — Yassin Alata
(74) *Attorney, Agent, or Firm* — Chris Kolefas

(57) ABSTRACT

To secure easiness of component selection at a reception side. A transmission stream is generated in which a first transmission packet including a predetermined component and a second transmission packet including signaling information related to the predetermined component are multiplexed in a time division manner.

14 Claims, 37 Drawing Sheets

Related U.S. Application Data division of application No. 15/322,573, filed as application No. PCT/JP2015/069772 on Jul. 9, 2015, now Pat. No. 10,841,629.

(51) Int. Cl.
*H04N 21/462* (2011.01)
*H04N 21/61* (2011.01)

(52) U.S. Cl.
CPC ..... *H04N 21/4622* (2013.01); *H04N 21/6112* (2013.01); *H04N 21/6125* (2013.01)

(56) References Cited

U.S. PATENT DOCUMENTS

2013/0278828 A1 10/2013 Todd
2014/0317674 A1 10/2014 Hwang

FOREIGN PATENT DOCUMENTS

| WO | 2011/151960 | 12/2011 |
| WO | 2012/157756 | 11/2012 |
| WO | 2013/043000 | 3/2013 |
| WO | WO 2013/077697 A1 | 5/2013 |

OTHER PUBLICATIONS

Office Action dated Aug. 20, 2019 in corresponding Japanese Patent Application No. 2016-532967, 4 pages.

Extended European Search Report dated Dec. 7, 2017 in corresponding European Patent Application No. 15818243.6, 7 pages.

Anonymous: "Technology under Considerations on MPEG Media Transport", 97. MPEG Meeting; Jul. 18, 2011-Jul. 22, 2011; Torino: (Motion Picture Expert Group or ISO/IEC JTC1 /SC29/WG11), No. N12170, XP030018665, Aug. 24, 2011, 71pages.

Shuichi Aoki et al., "Effective Usage of MMT in Broadcasting Systems", 2013 IEEE International Symposium On Broadband Multimedia Systems And Broadcasting (BMSB), IEEE, XP032495764, Jun. 5, 2013, pp. 1-6.

International Standard, "Information Technology—High Efficiency Coding and Media Delivery in Heterogeneous Environments—Part 1: MPEG Media Transport (MMT)", ISO/IEC 23008-1 :2014 (E), XP082005259, First Edition, Jun. 1, 2014, 98 pages.

\* cited by examiner

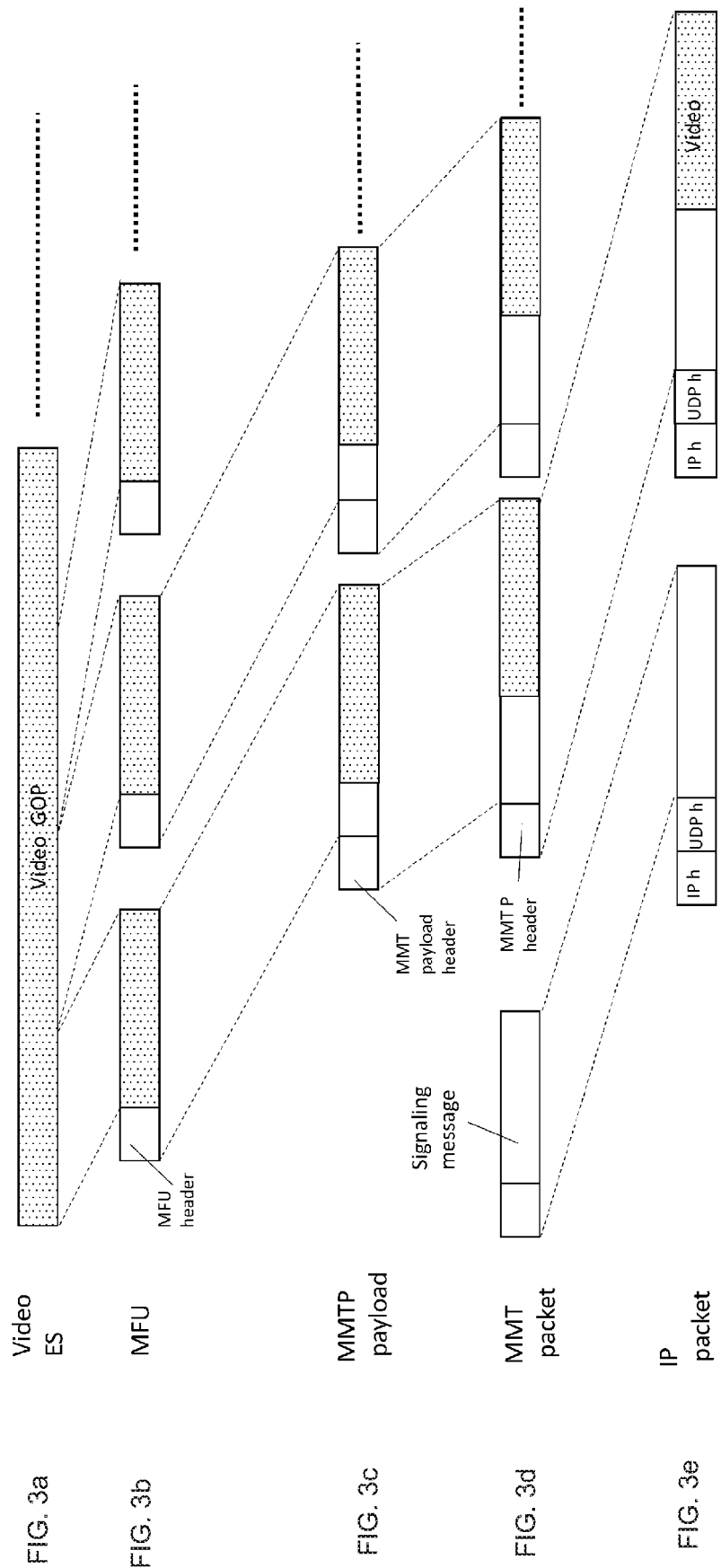

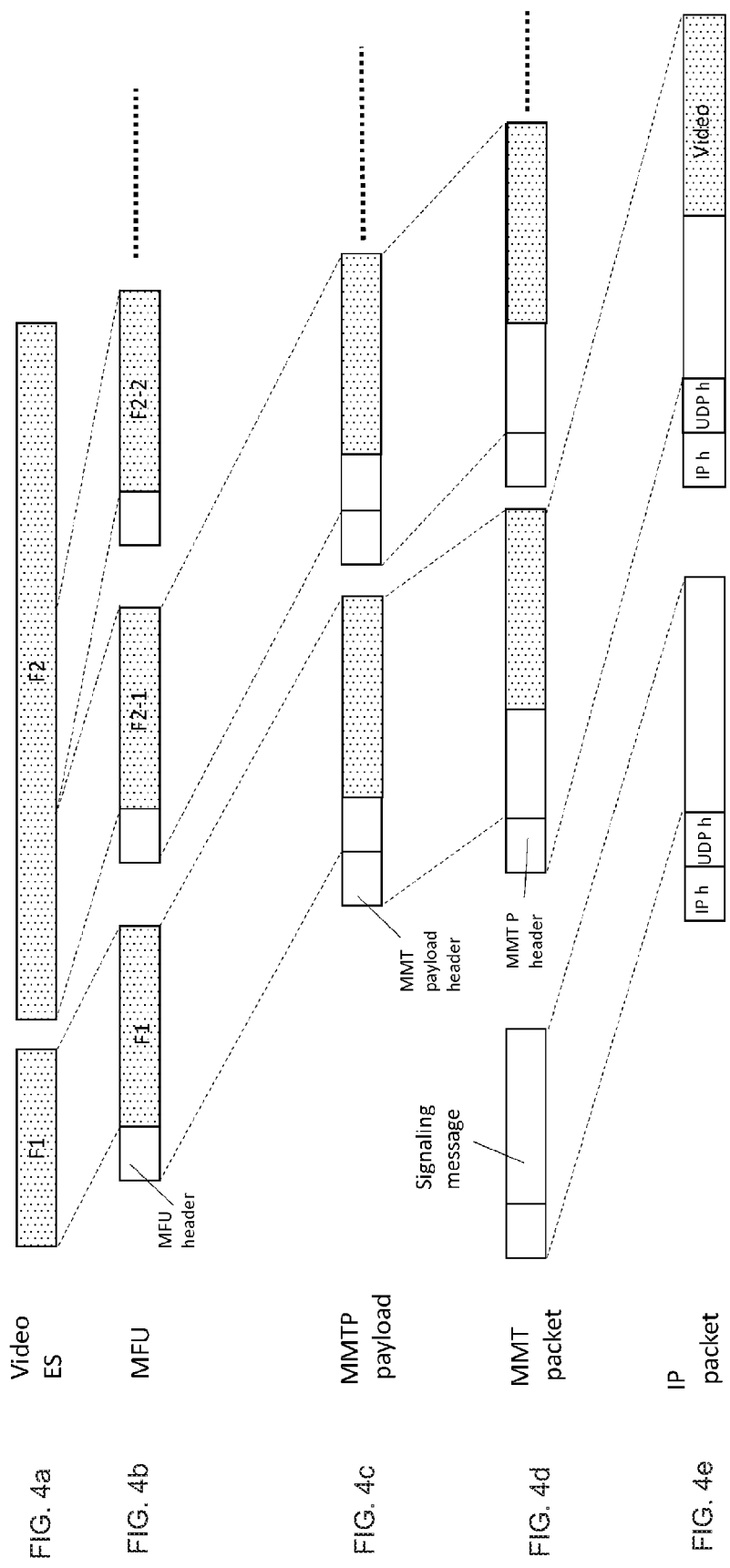

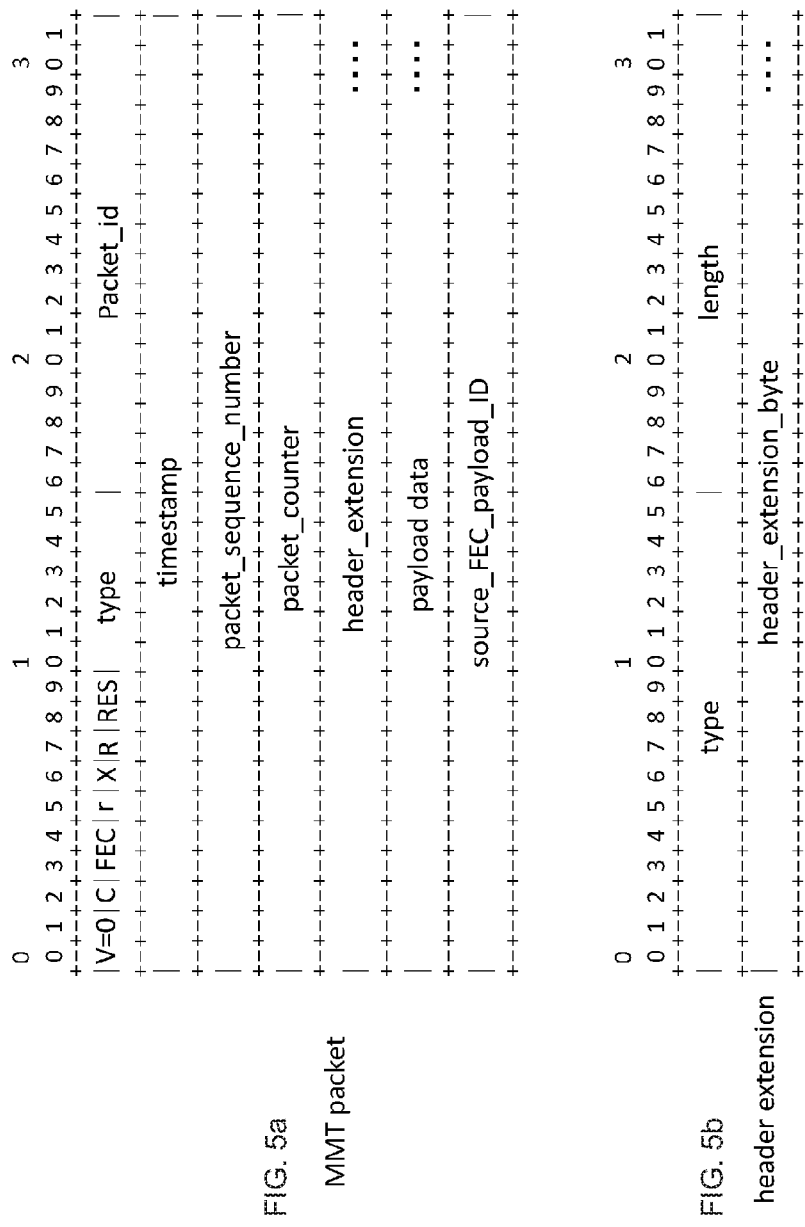

MMTP payload

DU_Header
(Timed)

DU_Header
(Non-Timed)

FIG. 14

DESCRIPTION OF PARAMETERS OF PA MESSAGE

| FIELDS | JAPANESE FIELD NAMES | DESCRIPTION |
|---|---|---|
| message_id | MESSAGE ID | FIXED VALUE IDENTIFYING PA MESSAGE IN VARIOUS KINDS OF SIGNALING INFORMATION |
| version | VERSION | 8-BIT INTEGER VALUE INDICATING VERSION OF PA MESSAGE. INCREMENTED BY +1 WHEN SOME PARAMETERS CONSTITUTING MPT ARE UPDATED. |
| length | TABLE LENGTH | NUMBER OF BYTES OF PA MESSAGE. COUNTED DIRECTLY AFTER THIS FIELD |

FIG.15

DESCRIPTION OF PARAMETERS OF MP TABLE

| FIELDS | JAPANESE FIELD NAMES | DESCRIPTION |
|---|---|---|
| table_id | TABLE ID | FIXED VALUE IDENTIFYING MP TABLE IN VARIOUS KINDS OF SIGNALING INFORMATION |
| version | VERSION | 8-BIT INTEGER VALUE INDICATING VERSION OF MPT. INCREMENTED BY +1 WHEN SOME PARAMETERS CONSTITUTING MPT ARE UPDATED |
| length | TABLE LENGTH | NUMBER OF BYTES OF MP TABLE. COUNTED DIRECTLY AFTER THIS FIELD. |
| Package_id | PACKAGE ID | IDENTIFICATION INFORMATION OF ENTIRE PACKAGE IN WHICH ALL SIGNALS AND FILES TRANSMITTED THROUGH BROADCAST SIGNAL ARE SET AS COMPONENTS. |
| MPT_descriptors | MPT DESCRIPTOR REGION | STORAGE REGION OF DESCRIPTOR RELATED TO ENTIRE PACKAGE. DESCRIPTORS OF VARIOUS OBJECTS ARE ASSUMED, AND ONE OR MORE DESCRIPTORS ARE ASSUMED TO BE ARRANGED. |
| Number_of_assets | NUMBER OF ASSETS | NUMBER OF SIGNALS (ASSETS) SERVING AS ELEMENT CONSTITUTING PACKAGE. FOLLOWING ASSET LOOPS ARE ARRANGED ACCORDING TO NUMBER. |
| Asset_id | ASSET ID | ID IDENTIFYING ASSET UNIQUELY |
| gen_loc_info | GENERAL LOCATION INFORMATION | INDICATE LOCATION OF ACQUISITION DESTINATION OF ASSET |
| Asset_descriptors | ASSET DESCRIPTOR REGION | STORAGE REGION OF DESCRIPTOR RELATED TO ASSET. DESCRIPTORS OF VARIOUS OBJECTS ARE ASSUMED, AND ONE OR MORE DESCRIPTORS ARE ASSUMED TO BE ARRANGED. |

FIG. 16

| Syntax | Value | No. of bits | Mnemonic |
|---|---|---|---|
| PA_message () { | | | |
|     message_id | | 16 | uimsbf |
|     version | | 8 | uimsbf |
|     length | | 32 | uimsbf |
|     extension { | | | |
|         number_of_tables | N1 | 8 | uimsbf |
|         for (i=0; i<N1; i++) { | | | |
|             table_id | | 8 | uimsbf |
|             table_version | | 8 | uimsbf |
|             table_length | | 16 | uimsbf |
|         } | | | |
|     } | | | |
|     message_payload { | | | |
|         for (i=0; i<N1; i++) { | | | |
|             table() | | | |
|         } | | | |
|     } | | | |
| } | | | |

FIG. 17

| Syntax | Value | No. of bits | Mnemonic |
|---|---|---|---|
| MP_table() { | | | |
|   table_id | | 8 | uimsbf |
|   version | | 8 | uimsbf |
|   length | | 16 | uimsbf |
|   reserved | '11 1111' | 6 | bslbf |
|   MP_table_mode | | 2 | bslbf |
|   If (table_id == SUBSET_0_MPT_TABLE_ID) { | | | |
|     MMT_package_id { | | | |
|       MMT_package_id_length | N1 | 8 | uimsbf |
|       for (i=0; i<N1; i++) { | | | |
|         MMT_package_id_byte | | 8 | uimsbf |
|       } | | | |
|     } | | | |
|     MP_table_descriptors { | | | |
|       MP_table_descriptors_length | N2 | 16 | uimsbf |
|       for (i=0; i<N2; i++) { | | | |
|         MP_table_descriptors_byte | | 8 | uimsbf |
|       } | | | |
|     } | | | |
|   } | | | |
|     number_of_assets | N3 | 8 | uimsbf |
|     for (i=0; i<N3; i++) { | | | |
|       identifier_type | | 8 | uimsbf |
|       asset_id_scheme | | 32 | uimsbf |
|       asset_id_length | | 8 | uimsbf |
|       for(j=0;j<N4;j++){ | | | |
|         asset_id_byte | | 8 | uimsbf |
|       } | | | |
|       asset_type | | 32 | char |
|       reserved | '1111 111' | 7 | bslbf |
|       asset_clock_relation_flag | | 1 | bslbf |
|       asset_location { | | | uimsbf |
|         location_count | N6 | 8 | |
|         for (i=0; i<N6; i++) { | | | |
|           MMT_general_location_info() | | | |
|         } | | | |
|       } | | | |
|       asset_descriptors { | | | |
|         asset_descriptors_length | N5 | 16 | uimsbf |
|         for (j=0; j<N5; j++) { | | | |
|           asset_descriptors_byte | | 8 | uimsbf |
|         } | | | |
|       } | | | |
|     } | | | |
|   } | | | |

FIG. 18

COMPONENT STRUCTURE TABLE (CST) 1

| DATA STRUCTURE | NUMBER OF BITS | BIT STRING NOTATION | DESCRIPTION |
|---|---|---|---|
| Component_Structure_Table(){ | | | |
|   table_id | 8 | uimsbf | TABLE ID  CST-SPECIFIC VALUE |
|   version | 8 | uimsbf | VERSION  VERSION OF CST |
|   length | 16 | uimsbf | LENGTH (NUMBER OF BYTES) |
|   default_selection_policy | 4 | bslbf | DEFAULT SELECTION POLICY  0: APPLICATION SELECTION  1: GUI SELECTION  2: AUTOMATIC SELECTION |
|   reserved | 4 | bslbf | |
|   no_of_component_category | 8 | uimsbf | NUMBER OF COMPONENT CATEGORIES |
|   for(i=0;i<no_of_component_category;i++){ | | | |
|     category_type | 4 | bslbf | CATEGORY TYPE (VIDEO, AUDIO, etc) |
|     component_selection_policy | 4 | bslbf | COMPONENT SELECTION POLICY |
|     no_of_integrated_component | 8 | uimsbf | NUMBER OF INTEGRATED COMPONENTS |

FIG. 19

COMPONENT STRUCTURE TABLE (CST) 2 (CONTINUED)

| DATA STRUCTURE | NUMBER OF BITS | BIT STRING NOTATION | DESCRIPTION |
|---|---|---|---|
| for(j=0;j<no_of_integrated_component;j++){ | | | |
| integrated_component_id | 8 | uimsbf | INTEGRATED COMPONENT ID |
| combination_tag | 8 | uimsbf | COMBINATION TAG |
| composite_flag | 1 | bslbf | COMPOSITE FLAG<br>1: COMPOSITION OF ATOMIC COMPONENT IS INCLUDED |
| adaptive_flag | 1 | bslbf | ADAPTIVE SWITCHING FLAG<br>1: ADAPTIVE SWITCHING OF ATOMIC COMPONENT IS INCLUDED |
| default_flag | 1 | bslbf | DEFAULT FLAG<br>1: DEFAULT SELECTION TARGET |
| emergency_flag | 1 | bslbf | EMERGENCY FLAG<br>1: INTEGRATED COMPONENT FOR EMERGENCY |
| conditional_access_type | 2 | bslbf | CONDITIONAL ACCESS FLAG<br>INDICATES PAID/FREE AND ENCRYPTION/NON-ENCRYPTION |
| reserved | 2 | bslbf | |
| integrated_comp_descriptors_length | 16 | uimsbf | DESCRIPTOR REGION LENGTH OF INTEGRATED COMPONENT |
| for(k=0;k<integrated_comp_descriptors_length;k++){ | | bslbf | |
| integrated_comp_descriptors_byte | 8 | bslbf | DESCRIPTOR REGION FOR INTEGRATED COMPONENT |
| } | | | |
| no_of_atomic_component | 8 | bslbf | NUMBER OF UNIT COMPONENTS |

FIG. 20

COMPONENT STRUCTURE TABLE (CST) 3 (CONTINUED)

| DATA STRUCTURE | NUMBER OF BITS | BIT STRING NOTATION | DESCRIPTION |
|---|---|---|---|
| for(k=0;k<no_of_atomic_component;k++){ | | | |
| component_tag | 16 | uimsbf | COMPONENT TAG |
| atomic_component_type | 2 | bslbf | UNIT COMPONENT TYPE (single/composite/adaptive/composite+adaptive) |
| reserved | 6 | bslbf | |
| atomic_comp_descripors_length | 8 | uimsbf | DESCRIPTOR REGION LENGTH OF UNIT COMPONENT |
| for(l=0;l<atomic_comp_descriptors_length;l++){ | | | |
| atomic_comp_descriptors_byte | 8 | bslbf | DESCRIPTOR REGION FOR UNIT COMPONENT |
| } | | | |
| } | | | |
| } | | | |

FIG. 21

INTEGRATED VIDEO COMPONENT DESCRIPTOR

| DATA STRUCTURE | NUMBER OF BITS | BIT STRING NOTATION | DESCRIPTION |
|---|---|---|---|
| integrated_video_component_descriptor(){ | | | |
| descriptor_tag | 16 | uimsbf | DESCRIPTOR TAG |
| descriptor_length | 8 | uimsbf | DESCRIPTOR LENGTH |
| basic_format_flag | 1 | bslbf | BASIC FORMAT FLAG 1: THERE IS BASIC FORMAT DESCRIPTION |
| 3D_format_flag | 1 | bslbf | 3D FORMAT FLAG 1: THERE IS 3D FORMAT DESCRIPTION |
| language_code_flag | 1 | bslbf | LANGUAGE FLAG 1: THERE IS LANGUAGE DESCRIPTION |
| specific_video_flag | 1 | bslbf | SPECIFIC VIDEO FLAG 1: THERE IS SPECIFIC VIDEO TYPE DESCRIPTION |
| reserved | 4 | bslbf | |
| if(basic_format_flag==1){ | | | |
| video_resolution | 4 | uimsbf | RESOLUTION 1:180, 2:240, 3:480, 4:720, 5:1080, 6:2160, 7:4320 |
| video_aspect_ratio | 4 | uimsbf | ASPECT RATIO 1:4:3, 2:16:9wPV, 3 16:9 wo PV, 4: 16:9 OR MORE |
| video_scan_flag | 1 | bslbf | SCAN FLAG 0:interlace , 1:progressive |
| reserved | 2 | bslbf | |
| video_frame_rate | 5 | uimsbf | FRAME RATE 1:15, 2:24/1.001, 3:24, 4:25, 5:30/1.001, 6:30, 7:50, 8:60/1.001, 9:60, 10:100, 11:120/1.001, 12:120 |
| } | | | |
| if(3D_format_flag==1){ | | | |
| 3D_format_type | 8 | bslbf | 3D FORMAT TYPE 1:stereo/SbS, 2:stereo/T&B 3:stereo/SharedCast, 4:stereo/FCC, 5:stereo/Scalable |
| } | | | |
| if(language_code_flag==1){ | | | |
| ISO_639_language_code | 24 | bslbf | LANGUAGE CODE |
| } | | | |
| if(specific_video_flag==1){ | | | |
| specific_video_type | 8 | bslbf | SPECIFIC VIDEO TYPE 1: SIGN LANGUAGE VIDEO |
| } | | | |
| } | | | |

FIG.22

INTEGRATED AUDIO COMPONENT DESCRIPTOR

| DATA STRUCTURE | NUMBER OF BITS | BIT STRING NOTATION | DESCRIPTION |
|---|---|---|---|
| Integrated_audio_component_descriptor(){ | | | |
| descriptor_tag | 16 | uimsbf | DESCRIPTOR TAG |
| descriptor_length | 8 | uimsbf | DESCRIPTOR LENGTH |
| basic_format_flag | 1 | bslbf | BASIC FORMAT FLAG 1: THERE IS BASIC FORMAT DESCRIPTION |
| language_code_flag | 1 | bslbf | LANGUAGE FLAG 1: THERE IS LANGUAGE DESCRIPTION |
| specific_audio_flag | 1 | bslbf | SPECIFIC AUDIO FLAG 1: THERE IS SPECIFIC AUDIO TYPE DESCRIPTION |
| ES_multi-lingual_flag | 1 | uimsbf | ES MULTI-LINGUAL FLAG 1: TWO-LANGUAGE MULTIPLEXING IS PERFORMED IN DUAL MONO |
| robust_level | 1 | belbf | ROBUSTNESS 0: NORMAL 1: HIGH ROBUSTNESS |
| reserved | 4 | bslbf | |
| if(basic_format_flag==1){ | | | |
| multichannel_mode | 8 | uimsbf | MULTICHANNEL MODE 1:single mono, 2:dual mono, 3:stereo 4: 2/1mode, 5:3/0mode, 6:2/2mode, 7:3/1mode, 8:3/2mode 9:3/2+LFEmode,····· 17:22.2ch |
| quality_indicator | 2 | bslbf | AUDIO QUALITY INDICATOR 1: MODE 1, 2: MODE 2, 3: MODE 3 |
| sampling_rate | 3 | bslbf | SAMPLING FREQUENCY 1:16KHz, 2:22.05KHz, 3:24KHz, 4::reserved 5: 32KHz, 6:44.1KHz, 7:48KHz |
| reserved | 3 | bslbf | |
| } | | | |
| if(language_code_flag==1){ | | | |
| ISO_639_language_code | 24 | bslbf | LANGUAGE CODE |
| if(ES_multi-lingual_flag==1){ | | | |
| ISO_639_language_code_2 | 24 | bslbf | LANGUAGE CODE 2 |
| } | | | |
| } | | | |
| if(specific_video_flag==1){ | | | |
| specific_audio_type | 8 | | SPECIFIC AUDIO TYPE 1: FOR VISION-IMPAIRED PERSON, 2: FOR HEARING-IMPAIRED PERSON |
| } | | | |
| } | | | |

FIG. 23

TARGET DEVICE DESCRIPTOR

| DATA STRUCTURE | NUMBER OF BITS | BIT STRING NOTATION | DESCRIPTION |
|---|---|---|---|
| target_device_descriptor(){ | | | |
| descriptor_tag | 16 | uimsbf | DESCRIPTOR TAG |
| descriptor_length | 8 | uimsbf | DESCRIPTOR LENGTH |
| number_of_taget_device | 8 | bslbf | NUMBER OF TARGET DEVICES |
| for(i=0;i<number_of_target_device;i++){ | 1 | bslbf | |
| target_device_type | 8 | bslbf | TARGET DEVICE TYPE |
| } | 5 | bslbf | |
| } | | | |

FIG. 24

TARGET REGION DESCRIPTOR

| DATA STRUCTURE | NUMBER OF BITS | BIT STRING NOTATION | DESCRIPTION |
|---|---|---|---|
| target_region_descriptor(){ | | | |
|   descriptor_tag | 16 | uimsbf | DESCRIPTOR TAG |
|   descriptor_length | 8 | uimsbf | DESCRIPTOR LENGTH |
|   region_spec_type | 8 | bslbf | REGION DESCRIPTION METHOD DESIGNATION 1: PREFECTURAL REGION DESIGNATION |
|   target_region_spec() | | | REGION DESIGNATOR: DATA OF REGION DESIGNATION SPECIFIED FOR EACH REGION DESCRIPTION METHOD DESIGNATION |
| } | | | |

FIG. 25

VIEW POINT DESCRIPTOR

| DATA STRUCTURE | NUMBER OF BITS | BIT STRING NOTATION | DESCRIPTION |
|---|---|---|---|
| view_point_descriptor(){ | | | |
| descriptor_tag | 16 | uimsbf | DESCRIPTOR TAG |
| descriptor_length | 8 | uimsbf | DESCRIPTOR LENGTH |
| view_tag | 8 | uimsbf | VIEW TAG IDENTIFICATION INFORMATION OF VIDEO CONTENT |
| for(i=0;i<N;i++){ | | | |
| view_name_byte | 8 | bslbf | VIEW NAME NAME OF VIDEO CONTENT |
| } | | | |
| } | | | |

FIG. 26

PARENTAL RATING DESCRIPTOR

| DATA STRUCTURE | NUMBER OF BITS | BIT STRING NOTATION | DESCRIPTION |
|---|---|---|---|
| Parental_rating_descriptor(){ | | | |
| descriptor_tag | 16 | uimsbf | DESCRIPTOR TAG |
| descriptor_length | 8 | uimsbf | DESCRIPTOR LENGTH |
| for(i=0;i<N;i++){ | | | |
| country_code | 24 | bslbf | COUNTRY CODE |
| rating | 8 | uimsbf | RATING  RATING+AGE OF 3 IS MINIMUM AGE |
| } | | | |

FIG.27

ADAPTIVE SWITCH DESCRIPTOR 1

| DATA STRUCTURE | NUMBER OF BITS | BIT STRING NOTATION | DESCRIPTION |
|---|---|---|---|
| adaptive_switch_descriptor(){ | | | |
| descriptor_tag | 16 | uimsbf | DESCRIPTOR TAG |
| descriptor_length | 8 | uimsbf | DESCRIPTOR LENGTH |
| path_type | 3 | bslbf | TRANSMISSION PATH TYPE  0: BROADCASTING, 1: COMMUNICATION MMT/IP MULTICAST, 2: COMMUNICATION MMT/UDP/IP, 3: COMMUNICATION MMT/TCP/IP, 4: COMMUNICATION HTTP |
| default_flag | 1 | bslbf | DEFAULT FLAG  1: DEFAULT SELECTION |
| priority_indicator_flag | 1 | bslbf | PRIORITY DESIGNATION FLAG 1: THERE IS PRIORITY DESIGNATION DESCRIPTION |
| bitrate_flag | 1 | bslbf | BIT RATE FLAG  1: THERE IS BIT RATE DESCRIPTION |
| video_format_flag | 1 | bslbf | VIDEO FORMAT FLAG  1: THERE IS VIDEO FORMAT DESCRIPTION |
| audio_format_flag | 1 | bslbf | AUDIO FORMAT FLAG  1: THERE IS AUDIO FORMAT DESCRIPTION |
| if(priority_indicator_flag==1){ | | | |
| priority_indicator | 8 | uimsbf | PRIORITY DESIGNATION. LARGE VALUE INDICATES HIGH PRIORITY. AS PRIORITY INCREASES, HIGHER QUALITY AND WIDER BAND ARE REQUIRED |
| } | | bslbf | |
| if(bitrate_flag==1){ | | bslbf | |
| bitrate | 16 | uimsbf | BIT RATE  10 kbps UNIT |
| } | | | |

FIG.28

ADAPTIVE SWITCH DESCRIPTOR 2

| DATA STRUCTURE | NUMBER OF BITS | BIT STRING NOTATION | DESCRIPTION |
|---|---|---|---|
| if(video_format_flag==1){ | | | |
| video_resolution | 4 | uimsbf | RESOLUTION |
| video_aspect_ratio | 4 | uimsbf | ASPECT RATIO |
| video_scan_flag | 1 | bslbf | SCAN FLAG |
| reserved | 2 | bslbf | |
| video_frame_rate | 5 | uimsbf | FRAME RATE |
| } | | | |
| if(audio_format_flag==1){ | | | |
| multichannnel_mode | 8 | uimsbf | MULTICHANNEL MODE |
| quality_indicator | 2 | bslbf | QUALITY INDICATOR |
| sampling_rate | 3 | bslbf | SAMPLING RATE |
| robust_level | 1 | bslbf | ROBUSTNESS  0: NORMAL  1: ROBUST |
| | 2 | bslbf | reserved |
| } | | | |
| } | | | |

FIG.29

COMPOSITE COMPONENT TYPE DESCRIPTOR

| DATA STRUCTURE | NUMBER OF BITS | BIT STRING NOTATION | DESCRIPTION |
|---|---|---|---|
| Composite_component_type_descriptor(){ | | | |
| descriptor_tag | 16 | uimsbf | DESCRIPTOR TAG |
| descriptor_length | 8 | uimsbf | DESCRIPTOR LENGTH |
| composite_component_type | 8 | bslbf | COMPOSITE COMPONENT TYPE |
| dependency_flag | 1 | bslbf | DEPENDENCY FLAG 1: COMPONENT DEPENDING ON OTHER COMPONENTS |
| reserved | 7 | bslbf | |
| if(dependency_flag==1){ | | | |
| dependent_component_tag | 16 | uimsbf | DEPENDENT TARGET COMPONENT TAG |
| } | | | |

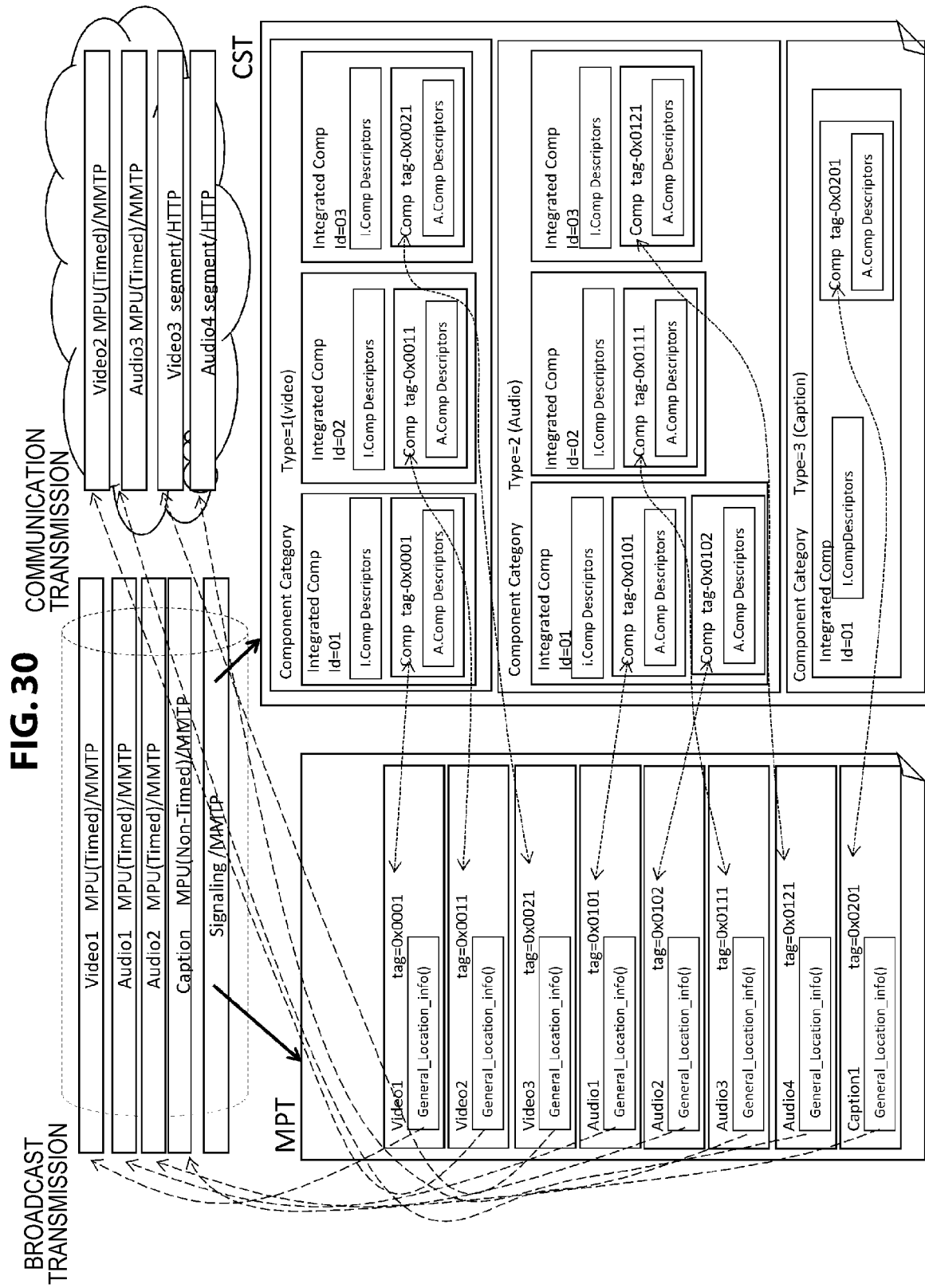

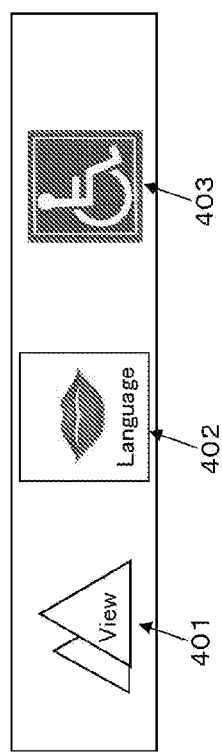
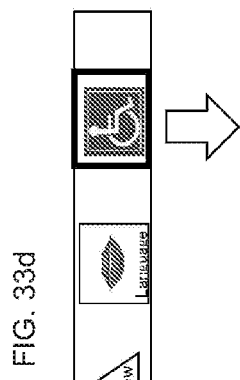
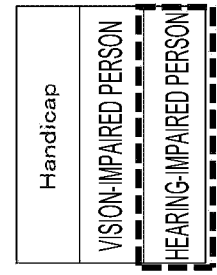
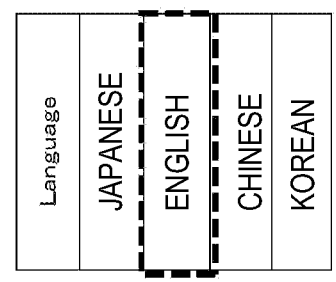
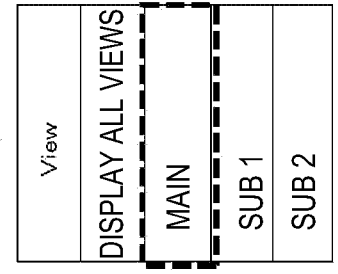

FIG. 34

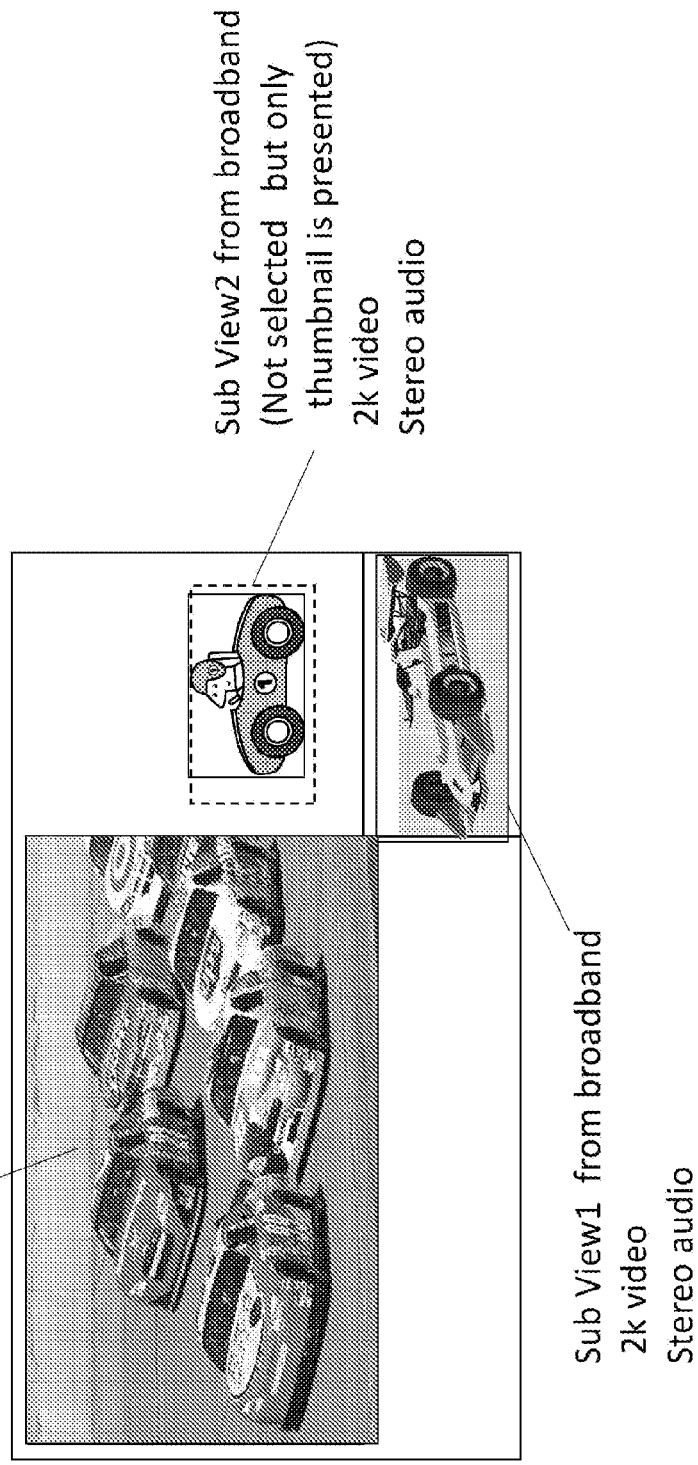

Main View
Video: 4K scalable video or 2K video
2K base layer from broadcast
extended layer from adaptive streaming
Audio :22.2ch scalable audio or stereo audio
stereo base layer from adaptive selection
among normal/high robust broadcast and broadband streaming Sub View2 from broadband
(Not selected but only thumbnail is presented)
2k video
Stereo audio Sub View1 from broadband
2k video
Stereo audio

MULTIVIEW COMPONENT LAYER MODEL

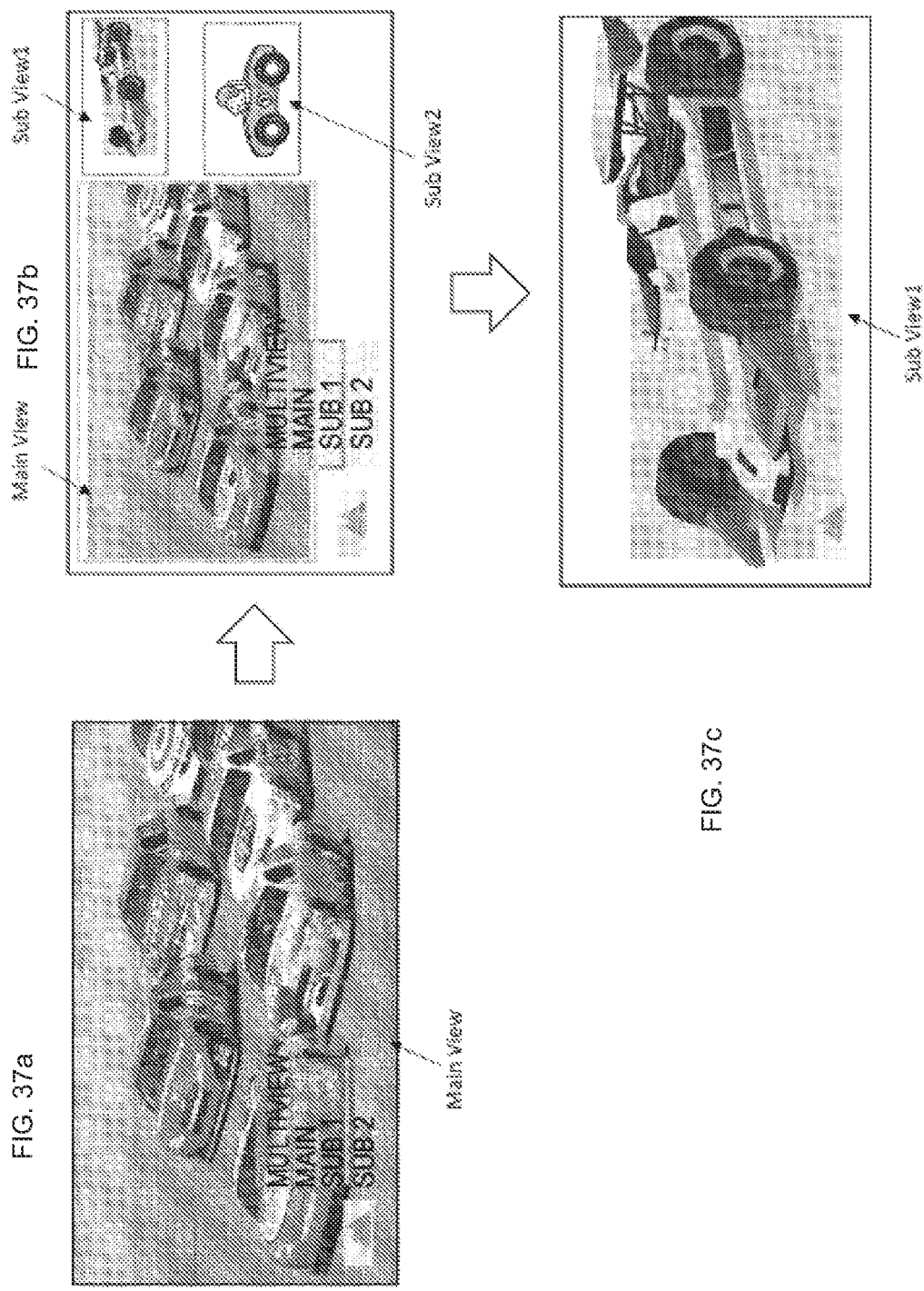

TRANSMISSION DEVICE, TRANSMISSION METHOD, RECEPTION DEVICE, AND RECEPTION METHOD

CROSS REFERENCE TO RELATED APPLICATIONS

This application is a U.S. National Phase of International Patent Application No. PCT/JP2015/069772 filed on Jul. 9, 2015, which claims priority benefit of Japanese Patent Application No. JP 2014-142113 filed in the Japan Patent Office on Jul. 10, 2014. Each of the above-referenced applications is hereby incorporated herein by reference in its entirety.

TECHNICAL FIELD

The present technology relates to a transmission device, a transmission method, a reception device, and a reception method, and more particularly, to a transmission device and the like suitable for the application to a broadcasting/communication hybrid transmission system.

BACKGROUND ART

In current broadcasting systems, a Moving Picture Experts Group-2 Transport Stream (MPEG-2 TS) scheme or a Real Time Protocol (RTP) scheme is being widely used as a media transport scheme (for example, see Patent Literature 1). An MPEG Media Transport (MMT) scheme (for example, see Non-Patent Literature 1) is under review as a next digital broadcasting scheme.

CITATION LIST

Patent Literature

Patent Literature 1: JP 2013-153291A

Non-Patent Literature

Non-Patent Literature 1: ISO/IEC FDIS 23008-1:2013(E) Information technology-High efficiency coding and media delivery in heterogeneous environments-Part 1: MPEG media transport (MMT)

SUMMARY OF INVENTION

Technical Problem

It is an object of the present technology to secure easiness of component selection at a reception side, for example, in a broadcasting/communication hybrid system.

Solution to Problem

A concept of the present technology is a transmission device, including: a transmission stream generator configured to generate a transmission stream in which a first transmission packet including a predetermined component and a second transmission packet including signaling information related to the predetermined component are multiplexed in a time division manner; a transmitting unit configured to transmit the transmission stream via a predetermined transmission path; and an information inserting unit configured to insert component selection information into the second transmission packet.

In the present technology, a transmission stream generator generates a transmission stream in which a first transmission packet including a predetermined component and a second transmission packet including signaling information related to the predetermined component are multiplexed in a time division manner. A transmitting unit transmits the transmission stream to a reception side via a predetermined transmission path.

An information inserting unit inserts component selection information into the second transmission packet. The component selection information may include selective layer information for performing fixed selection, composite layer information for performing composition, and adaptive layer information for performing dynamic switching from the top. In this case, for example, information for acquiring an acquisition destination may be included in information of each component that is selectable in an adaptive layer.

As described above, in the present technology, the component selection information is inserted into the second transmission packet. Thus, for example, in the broadcasting/communication hybrid system, easiness of component selection can be secured at the reception side.

In the present technology, for example, the transmission packet may be an MMT packet, and in the second transmission packet including a package access message, a component structure table including the component selection information may be arranged in the package access message together with an MMT package table. In this case, for example, a component of the component structure table may be associated with an asset of the MMT package table using a component tag.

Another concept of the present technology is a reception device, including: a first receiving unit configured to receive, via a first transmission path, a transmission stream in which a first transmission packet including a predetermined component and a second transmission packet including signaling information related to the predetermined component are multiplexed in a time division manner; and a second receiving unit configured to receive a transmission stream in which a third transmission packet including a predetermined component is arranged via a second transmission path. Component selection information is inserted into the second transmission packet, and the reception device further includes a component selecting unit configured to select a component to be presented based on the component selection information.

In the present technology, a first receiving unit receives a transmission stream via a first transmission path. A first transmission packet including a predetermined component and a second transmission packet including signaling information related to the predetermined component are multiplexed in a time division manner in the transmission stream. A second receiving unit receives a third transmission packet including a predetermined component via a second transmission path. For example, the first transmission path may be a broadcast transmission path, and the second transmission path may be a network transmission path.

The component selection information is inserted into the second transmission packet. A component selecting unit selects a component to be presented based on the component selection information. For example, the component selecting unit may cause a selection graphic user interface to be displayed on a screen when there is a variation related to a specific attribute to be selected by a user in the component selection information.

For example, the component selection information may include selective layer information for performing fixed selection, composite layer information for performing composition, and adaptive layer information for performing dynamic switching from the top. In this case, information for acquiring an acquisition destination may be included in information of each component that is selectable in the adaptive layer.

As described above, in the present technology, a component to be presented is selected based on the component selection information into which the second transmission packet is inserted. Thus, for example, in the broadcasting/communication hybrid system, easiness of component selection can be secured.

Advantageous Effects of Invention

According to the present technology, it is possible to secure easiness of component selection at a reception side, for example, in a broadcasting/communication hybrid system. The effect described in this specification is not limiting but merely an example, and additional effects may be obtained.

BRIEF DESCRIPTION OF DRAWINGS

FIGS. 3a, 3b, 3c, 3d and 3e are a diagram illustrating an exemplary packet configuration when timed media is transmitted.

FIGS. 4a, 4b, 4c, 4d and 4e are a diagram illustrating an exemplary packet configuration when non-timed media is transmitted.

FIGS. 5a and 5b are a diagram illustrating an exemplary configuration of an MMT packet.

FIG. 14 is a diagram illustrating a description of main parameters of a PA message.

FIG. 15 is a diagram illustrating a description of main parameters of an MP table.

FIG. 16 is a diagram illustrating an exemplary structure (syntax) of a PA message.

FIG. 17 is a diagram illustrating an exemplary structure (syntax) of an MP table (MPT).

FIG. 18 is a diagram illustrating an exemplary structure (1/3) of a component structure table (CS table).

FIG. 19 is a diagram illustrating an exemplary structure (2/3) of the component structure table (CS table).

FIG. 20 is a diagram illustrating an exemplary structure (3/3) of the component structure table (CS table).

FIG. 21 is a diagram illustrating an exemplary structure (syntax) of an integrated video component descriptor.

FIG. 22 is a diagram illustrating an exemplary structure (syntax) of an integrated audio component descriptor.

FIG. 23 is a diagram illustrating an exemplary structure (syntax) of a target device descriptor.

FIG. 24 is a diagram illustrating an exemplary structure (syntax) of a target region descriptor.

FIG. 25 is a diagram illustrating an exemplary structure (syntax) of a view point descriptor.

FIG. 26 is a diagram illustrating an exemplary structure (syntax) of a parental rating descriptor.

FIG. 27 is a diagram illustrating an exemplary structure (syntax) (1/2) of an adaptive switch descriptor.

FIG. 28 is a diagram illustrating an exemplary structure (syntax) (2/2) of the adaptive switch descriptor.

FIG. 29 is a diagram illustrating an exemplary structure (syntax) of a composite component type descriptor.

FIG. 30 is a diagram illustrating a specific example of an association of an MPT and a CST.

FIGS. 33a, 33b 33c and 33d are a diagram illustrating an example of a component selection GUI.

FIG. 34 is a diagram for describing a use case (multiview) of a component selection/acquisition process by a CST/MPT in a receiver.

FIGS. 37a, 37b and 37c are a diagram for describing an exemplary selection process based on a CST in a receiver.

DESCRIPTION OF EMBODIMENT(S)

Hereinafter, modes (hereinafter referred to as "embodiments") of carrying out the invention will be described. The description will proceed in the following order.
1. Embodiments
2. Modified examples 1. Embodiments

[Exemplary Configuration of Broadcasting/Communication Hybrid System]

Figure 1:
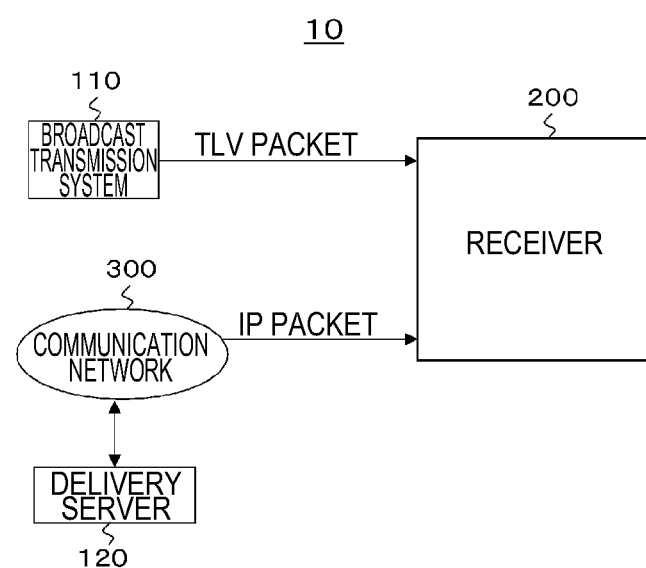
FIG. 1 is a block diagram illustrating an exemplary configuration of a broadcasting/communication hybrid system according to an embodiment.

FIG. 1 illustrates an exemplary configuration of a broadcasting/communication hybrid system 10. In the broadcasting/communication hybrid system 10, a broadcast transmission system 110 and a delivery server 120 are arranged on a transmission side, and a receiver 200 is arranged on a reception side.

The broadcast transmission system 110 transmits, for example, a broadcast signal of an Internet Protocol (IP) scheme including transmission media (component). As the transmission media, there are timed media and non-timed media. For example, the timed media is stream data such as a video, audio, captions, or the like. For example, the non-timed media is file data such as HTML document data or other data.

The delivery server 120 delivers a transmission stream in which IP packets including the transmission media (component) are consecutively arranged to the reception side via the communication network 300, for example, according to a request from the reception side.

The receiver 200 receives the broadcast signal of the IP scheme transmitted from the broadcast transmission system 110, and receives the transmission stream in which the IP packets are consecutively arranged from the delivery server 120. The receiver 200 acquires the transmission media (component) such as a video or audio to be presented from the reception signal by such broadcasting/communication hybrid transmission, and presents an image, a sound, or the like.

Figure 2:
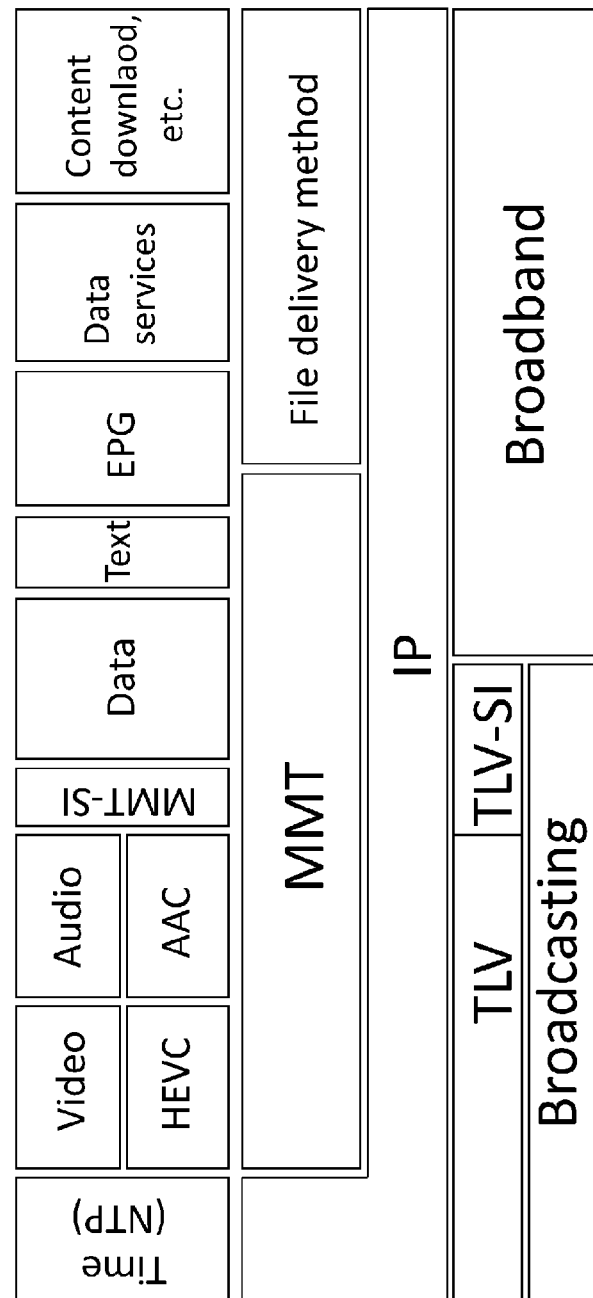
FIG. 2 is a diagram illustrating a stack model showing an exemplary broadcasting/communication signal configuration.

FIG. 2 illustrates a stack model showing an exemplary broadcasting/communication signal configuration. For broadcasting, there is a type length value (TLV) transmission packet in a lower layer. The IP packet is arranged above the TLV transmission packet. There is also a TLV transmission packet in which a transmission control signal is arranged as signaling information. For communication (broadband), there is an IP packet in the lower layer.

A multiplexed transport packet is arranged above the IP packet. Examples of the multiplexed transport packet include an MPEG Media Transport (MMT) packet, a HyperText Transfer Protocol (HTTP) packet, a Real-time Transport Protocol (RTP) packet, and a File Delivery over Unidirectional Transport protocol (FLUTE) packet. Hereinafter, in this embodiment, for example, the MMT packet is assumed to be used as the multiplexed transport packet. As the IP packet, there is also an IP packet in which a Network Time Protocol (NTP) packet including time information is arranged.

Stream data such as a video, audio, or captions and file data such as HTML document data or other data are inserted into a payload portion of the MMT packet. A signaling message is also inserted into the payload portion of the MMT packet.

FIGS. 3a, 3b, 3c, 3d and 3e illustrates an exemplary packet configuration when the timed media is transmitted. FIG. 3a illustrates a video elementary stream (video ES). The video elementary stream is divided into clusters of a predetermined size which are arranged in a payload portion of an MIVIT fragment unit (MFU) as illustrated in FIG. 3b.

As illustrated in FIG. 3c, an MMT payload header is added to the MFU to constitute an MMTP payload. Then, as illustrated in FIG. 3d, the MMTP header (the MMT packet header) is further added to the MMTP payload to constitute the MMT packet.

As the MMT packet, there is also an MMT packet in which a signaling message is included in a payload portion. As illustrated in FIG. 3e, a UDP header and an IP header are added to the MMT packet, so that the IP packet (IP packet) is generated. Although not illustrated, as the IP packet, there is also an IP packet including an MMT packet of other transmission media such as audio or captions.

FIGS. 4a, 4b, 4c, 4d and 4e illustrates an exemplary packet configuration when the non-timed media is transmitted. FIG. 4a illustrates a file. Each of F1 and F2 indicates one file. For example, F1 is a file used in a certain program, and F2 is a file used in a next program.

Since the file of F1 has a small file size, the entire file of F1 is arranged in the payload of the MFU as illustrated in FIG. 4b. On the other hand, since the file of F2 has a large file size, the file of F2 is divided into a plurality of clusters, that is, a plurality of fragments, and each fragment is arranged in the payload of the MFU as illustrated in FIG. 4b.

As illustrated in FIG. 4c, the MMT payload header is added to the MFU to constitute the MMTP payload. In this case, since the MFU having file data of F1 has a small size, the MFU is arranged in one MMTP payload. On the other hand, each of the MFUs having divisional data of F2-1, F2-2, and the like is arranged in one MMTP payload. Then, as illustrated in FIG. 4d, the MMTP header (the MMT packet header) is further added to the MMTP payload to constitute the MMT packet.

As the MMT packet, there is also an MMT packet in which a signaling message is included in a payload as illustrated in FIG. 4d. As illustrated in FIG. 4e, the UDP header and the IP header are added to the MMT packet, so that the IP packet is generated.

FIG. 5a illustrates an exemplary configuration of the MMT packet. The MMT packet includes the MMTP header) and the MMTP payload. A 2-bit field of "V" indicates a version of an MMT protocol. According to a first edition of an MMT standard, this field is "00." A 1-bit field of "C" indicates packet counter flag (packet_counter_flag) information and is "1" when there is a packet counter flag. A 2-bit field of "FEC" indicates an FEC type (FEC_type).

A 1-bit field of "X" indicates extension header flag (extension flag) information and is "1" when header extension of the MMT packet is performed. In this case, there is a field of "header_extension" which will be described later. A 1-bit field of "R" indicates RAP flag (RAP_flag) information and is "1" when the MMT payload transmitted through the MMT packet includes a head of a random access point.

A 6-bit field of "type" is payload type (payload type) information and indicates a data type of the MMTP payload. For example, "0x00" indicates that the payload is a Media Processing Unit (MPU), and "0x02" indicates that the payload is a signaling message.

A 16-bit field of "packet_id" indicates a packet identifier (packet_id) identifying a data type of the payload. A 32-bit field of "timestamp" indicates a type stamp for transmission, that is, a time at which the MMT packet is transmitted from the transmission side. This time is indicated in an NTP short format. A 32-bit field of "packet_sequence_number" indicates a sequence number of the MMT packet having the same packet identifier (packet_id). A 32-bit field of "packet_counter" indicates an order of the MMT packet in the same IP data flow regardless of a value of the packet identifier (packet_id).

When the 1-bit flag information of "X" is "1," the field of "header_extension" indicating the MMT extension header is arranged after the 32-bit field of "packet_counter." Thereafter, a field of "payload data" and a field of "source_FEC_payload ID" constituting the MMTP payload are arranged.

FIG. 5b illustrates an exemplary configuration of the MIVIT extension header. A 16-bit field of "type" indicates a type of the extension header. A 16-bit field of "length" indicates a byte size of the extension header subsequent thereto. The byte size of the extension header differs according to the type of the extension header. A field of "header_extension_byte" indicates a data byte for header extension.

Figure 6A:
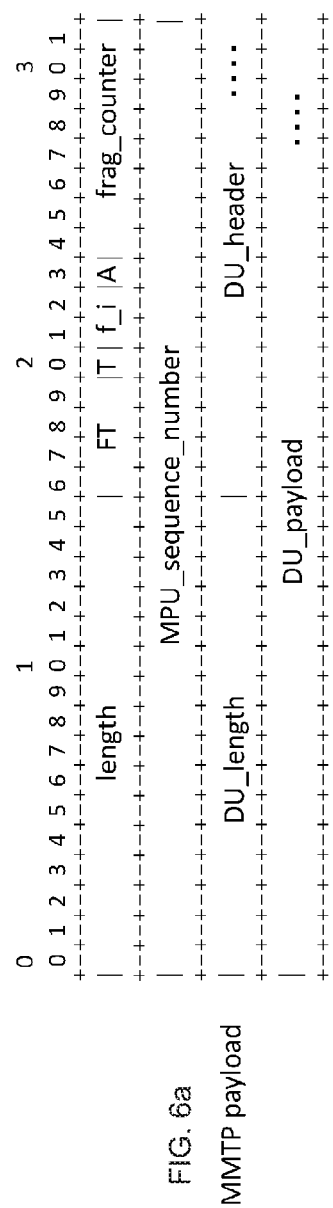
FIGS. 6a, 6b and 6c are a diagram illustrating an exemplary configuration (syntax) of an MMTP payload arranged in a "payload data" field of an MMT packet.

FIG. 6a illustrates an exemplary configuration (syntax) of the MMTP payload arranged in the field of "payload data" of the MMT packet. This example indicates an MPU mode in which "type" of the MMT header is "0x00." First, there is header information. A 16-bit field of "length" indicates a byte size of the entire MMTP payload. A 4-bit field of "FT" indicates a field type. "0" indicates that "MPU metadata" is included, "1" indicates that "Movie Fragment metadata" is included, and "2" indicates that "MFU" is included.

Here, the MFU is a unit obtained by subdividing the MPU into fragments. For example, in the case of a video, the MFU can be set to correspond to one NAL unit. For example, when the MFU is transmitted via a communication network transmission path, the MFU may be configured with one or more MTU sizes.

The MPU starts from a random access point and includes one or more access units (AUs). Specifically, for example, there are cases in which pictures of one Group Of Pictures (GOP) constitute one MPU. This MPU is defined according to an asset. Thus, a video MPU including only video data is generated from a video asset, and an audio MPU including only audio data is generated from an audio asset.

1-bit flag information of "T" indicates whether the timed media is transmitted, or the non-timed media is transmitted. "1" indicates the timed media, and "0" indicates the non-timed media.

A 2-bit field of "f_i" indicates whether an integer number of data units (DUs) are included in a field of "DU payload" or any one of first, intermediate, and last fragments obtained by fragmenting a data unit is included in the field of "DU payload." "0" indicates that an integer number of data units are included, "1" indicates that the first fragment is included, "2" indicates that the intermediate fragment is included, and "3" indicates that the last fragment is included.

1-bit flag information of "A" indicates whether or not a plurality of data units are included in the field of "DU payload." "1" indicates that a plurality of data units are included in the field of "DU payload," and "0" indicates that a plurality of data units are not included in the field of "DU payload." An 8-bit field of "frag_counter" indicates an order of a fragment when "f_i" is 1 to 3.

A 32-bit field of "MPU_sequence_number" is a number indicating an order of an MPU and serves as information identifying an MPU. For example, when one GOP constitutes one MPU, and "MPU_sequence_number" of a certain GOP is "i," "MPU_sequence_number" of a next GOP is "i+1."

After the field of "MPU_sequence_number," fields of "DU_length," "DU_header," and "DU_payload" are arranged. A 16-bit field of "DU_length" is not included when "A=0," that is, when a plurality of data units are not included in the field of "DU payload." Further, the field of "DU_header" is not included when "FT=0/1," that is, when "MPU metadata" or "Movie Fragment metadata" is included.

Figure 6B:
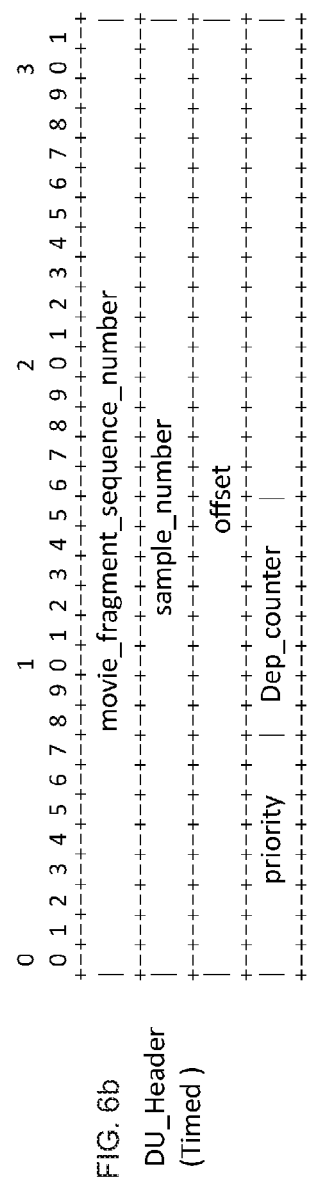

FIG. 6b illustrates an exemplary configuration (syntax) of "DU_header." This example illustrates an example in which "T=1," that is, the timed media is transmitted. A 32-bit field of "movie_fragment_sequence_number" indicates a sequence number of an MFU unit. For example, when an I picture is divided, each one is an MFU. A 32-bit field of "sample_number" indicates, for example, a number of a picture unit in the case of a video. A 32-bit field of "offset" indicates, for example, an offset value (a byte value) from a head of a picture in the case of a video.

Figure 6C:
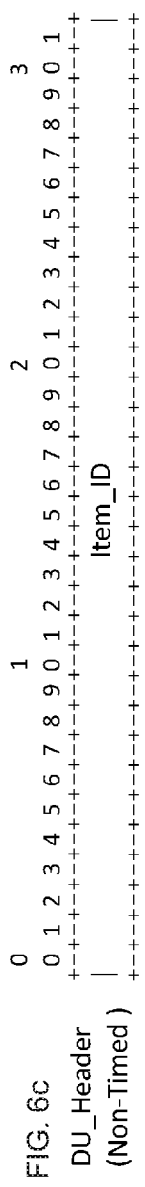

FIG. 6c illustrates an exemplary configuration of "DU_header." This example illustrates an example in which "T=0," that is, the non-timed media is transmitted. A 32-bit field of "item_ID" is an ID identifying an item (file).

Figure 7:
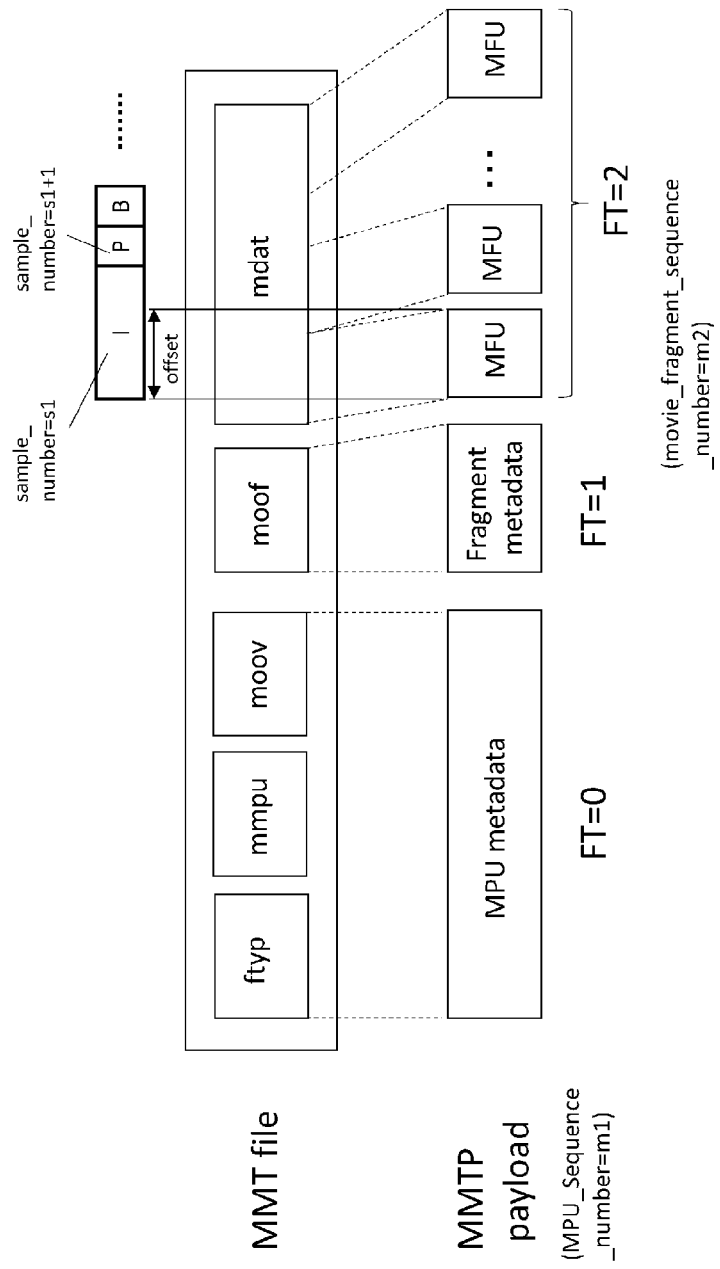
FIG. 7 is a diagram illustrating an example of a correspondence relation between an MMT file and an MMTP payload when video data of one GOP is transmitted.

In the MMT scheme, the transmission media such as a video is transmitted in a content format based on a fragmented ISO Base Media File Format (ISOBMFF). FIG. 7 illustrates an example of a correspondence relation between the MMT file and the MMTP payload when video data of one GOP is transmitted.

A configuration of the MMT file is basically substantially the same as a file MP4 configuration. First, an "ftyp" box is arranged. Subsequently, an "mmpu" box that is unique to the MMT is arranged. Subsequently, an "moov" box serving as metadata of the entire file is arranged.

Subsequently, a movie fragment is arranged. The movie fragment includes an "moof" box in which control information is included and an "mdat" box in which encoded data of a video is included. Here, since one GOP is assumed to constitute one MPU, only one set of movie fragments is arranged.

The metadata of the "ftyp," "mmpu," and "moov" boxes is transmitted as "MPU metadata" through one MMT packet. In this case, "FT" is "0." The metadata of the "moof" box is transmitted as "Movie Fragment metadata" through one MMT packet. In this case, "FT" is "1." The encoded data of the video included in the "mdat" box is fragmented into "MFUs," and each MFU is transmitted through one MMT packet. In this case, "FT" is "2."

Figure 8:
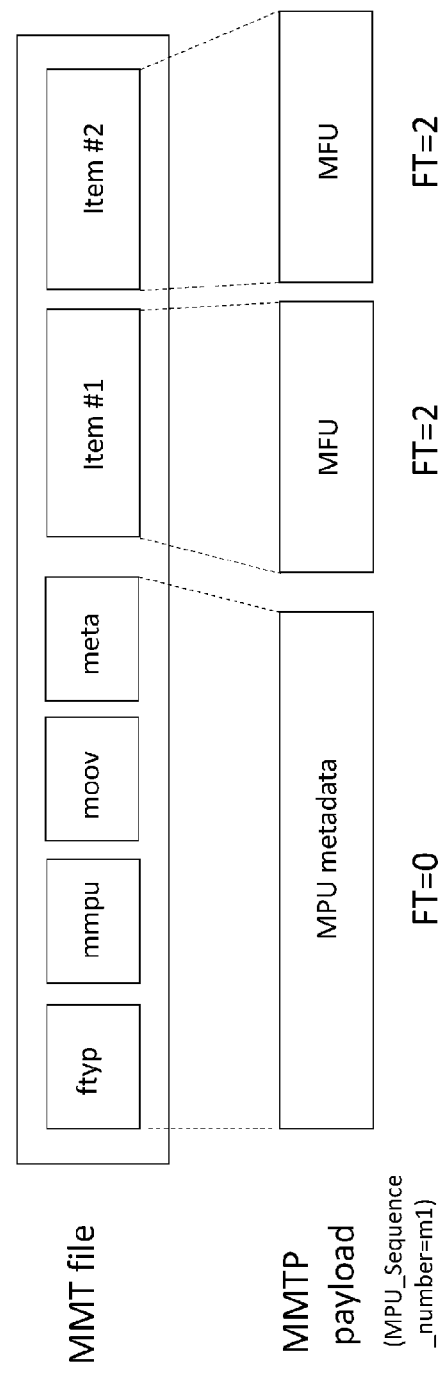
FIG. 8 is a diagram illustrating an example of a correspondence relation between an MMT file and an MMTP payload when two items (files) are transmitted.

FIG. 8 illustrates an example of a correspondence relation between the MMT file and the MMTP payload when two items (files) are transmitted.

A configuration of the MMT file is basically substantially the same as a file MP4 configuration. First, an "ftyp" box is arranged. Subsequently, an "mmpu" box that is unique to the MMT is arranged. Subsequently, "moov" and "meta" boxes serving as metadata of the entire file are arranged. Subsequently, "item #1" and "item #2" boxes in which an item (file) is included are arranged.

The metadata of the "ftyp," "mmpu," "moov," and "meta" boxes is transmitted as "MPU metadata" through one MMT packet. In this case, "FT" is "0." Each of the items (files) included in the "item #1" and "item #2" boxes is transmitted through one MMT packet. In this case, "FT" is "2."

Figure 9:
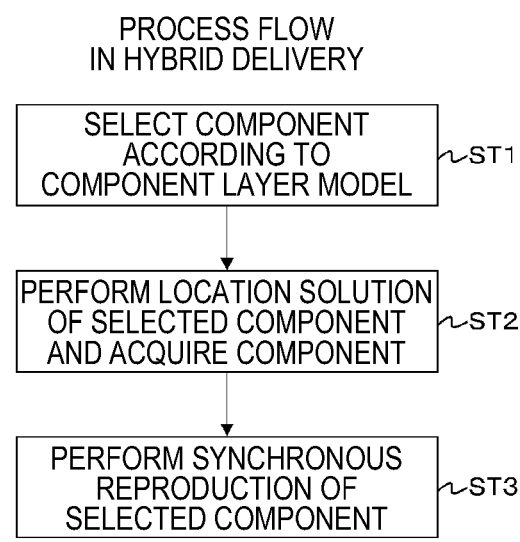
FIG. 9 is a diagram illustrating a process flow of a receiver in a hybrid delivery.

FIG. 9 illustrates a process flow of the receiver 200, that is, a process flow in a hybrid delivery. In step ST1, the receiver 200 selects a component to be presented according to a component layer model. In this case, the receiver 200 selects a component based on component selection information (the component layer model) inserted as signaling information.

Then, in step ST2, the receiver 200 performs location solution of the selected component, and acquires a component. In this case, the receiver 200 acquires a component based on component acquisition destination information inserted as signaling information. Then, in step ST3, the receiver 200 performs synchronous reproduction of the selected component.

Figure 10:
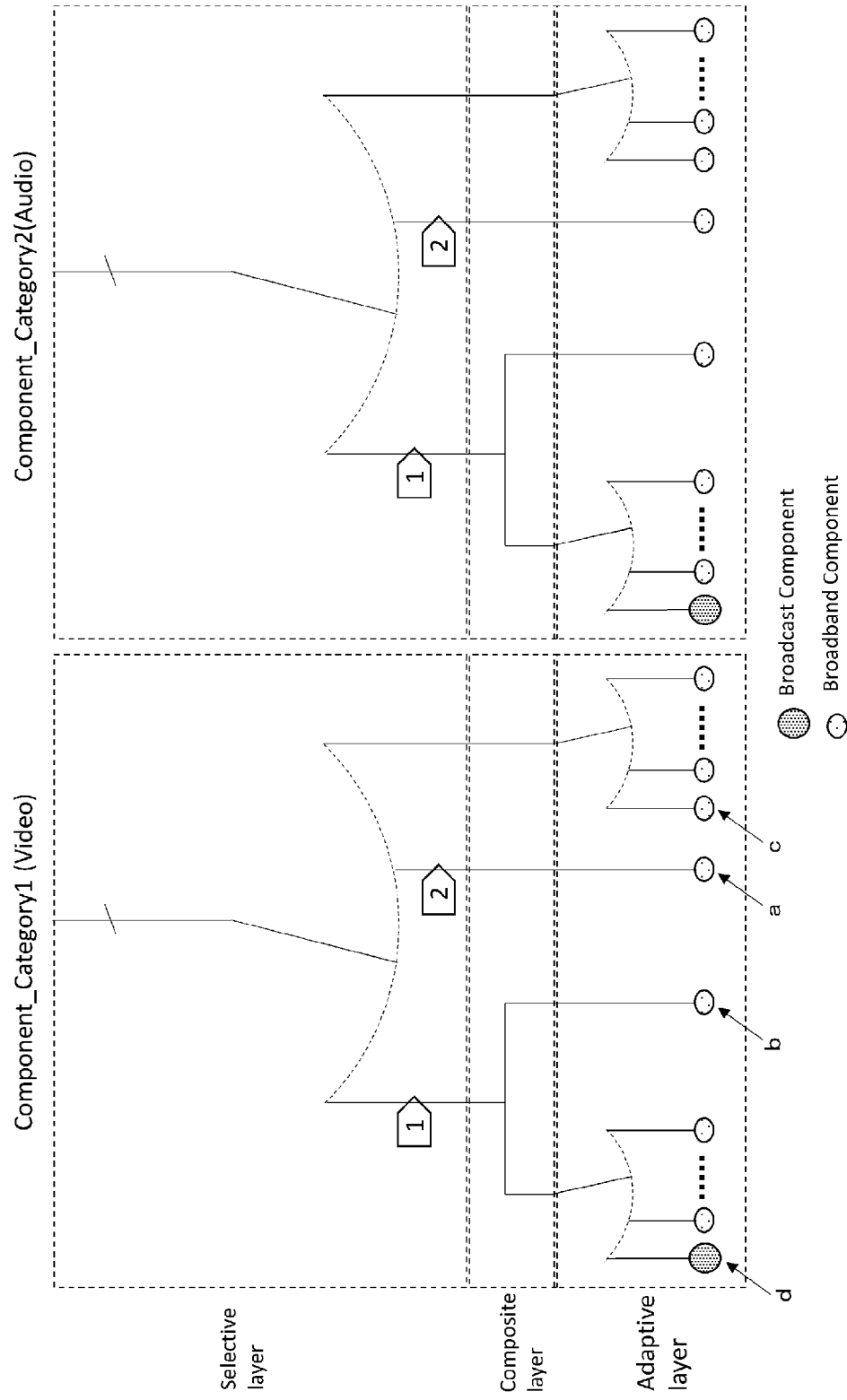
FIG. 10 is a diagram illustrating an example of a component layer model.

The component layer model will be described. FIG. 10 illustrates an example of the component layer model. The component layer model is a model in which component selection is performed based on a structure of three layers, that is, an adaptive layer, a composite layer, and a selective layer.

The adaptive layer is a layer that is positioned at the bottom and adaptively switches a component. The composite layer is a layer that is positioned in the middle, performs signal composition, and generates another signal. The selective layer is a layer that is positioned on the top and selects a component to be finally presented. The respective layers will be further described.

The selective layer is a layer that fixedly selects a component from a plurality of component choices in each component category by selection of the user or automatic selection of a terminal. Here, the component category indicates a unit to be selected such as a video or audio. In the illustrated example, two categories of a video and an audio are illustrated.

In the selective layer, for example, the following uses are assumed.
(1) A terminal automatically selects a component based on an attribute, or a component is selected by displaying a graphical user interface (GUI) for selection and allowing the user to make a selection.
(2) When there is only one component choice, a selection is not made, and one component is selected.
(3) There is a case in which a component is selected based on a combination of different component categories.
(4) When a plurality of components are selected, a video and captions are displayed on a plurality of screens, and audio is mixed and output.

In the selective layer, for example, the following attributes are used.
(1) A combination tag: an identifier (ID) of a combination of different component categories constituting one view. When there is the combination tag, selection is performed through category crossing.
(2) A language: a language is indicated by a language code.
(3) Video parameters: video parameters include a resolution, a frame rate, 3D information, and the like.
(4) Audio parameters: audio parameters include a multichannel mode, a sampling rate, and the like.
(5) A target region: a target region is indicated by a region code.
(6) A target device: a target device is indicated by a device type.
(7) A view title: a view title is a title for view selection.
(8) An object: an object includes, for example, narration and the like.

The composite layer is a layer that combines a plurality of components in each component category to function as one component. When there is the selective layer above the composite layer, it indicates that the combined signal is regarded as one signal and selected in the selective layer.

In the composite layer, for example, the following uses are assumed.
(1) Composition is performed based on an attribute indicating a type of composition and an attribute value indicating a position of composition.
(2) When there is only one component, the composition operation is unnecessary.

In the composite layer, for example, the following composition types and composition position information are used as attributes. In the following example, there are two positions, that is, "position 1" and "position 2."
(1) A composition type is scalable, and the composition position information is base and extended. For example, in the base, a display of an HD resolution is possible, but a display of a 4K resolution is possible in both the base and the extended.
(2) A composition type is 3D, and the composition position information is left and right.
(3) A composition type is tile, and the composition position information is a position of image tiling of "TileA1" and "TileA2." Here, the tile indicates obtaining an image having a large field of view by arranging images horizontally or vertically.
(4) A composition type is layer, and the composition position information is an order of superposition of "Layer1" and "Layer2" from the inside. Here, the layer indicates causing images to be superimposed in order from the inside.
(5) A composition type is mixing, and the composition position information is a track 1 and a track 2.

The adaptive layer is a layer that dynamically switches a plurality of components based on adaptive determination of a terminal to function as one component.

In the adaptive lay, for example, the following uses are assumed.
(1) As so-called adaptive streaming, an optimum component is automatically selected and switched by terminal intervals of a predetermined period of time (for example, 10 seconds).
(2) When there is only one component to be switched, an adaptive switching operation is unnecessary, and the component is constantly selected.
(3) When there are only components depending on a communication path, a component of an appropriate bit rate is selected according to an occupation state of a receiving buffer of a terminal that changes depending on a congestion state of a communication path.
(4) When a component depending on a broadcasting path is included, selection of a communication component is determined according to a bit rate thereof.
(5) When there are a plurality of components depending on the broadcasting path, a component is selected based on a physical received signal strength (robustness), for example, a component transmitted through a high-quality signal having normal robustness is selected when the weather is good, and a component transmitted through a low-quality signal having high robustness is selected when the weather is bad.

In the adaptive layer, for example, the following attributes are used.
(1) A path: there are a broadcasting path, a communication path, and the like as a path.
(2) A bit rate
(3) A robustness index: there are normal robustness, high robustness, and the like.
(4) Video parameters: video parameters include a resolution, a frame rate, and the like.
(5) Audio parameters: audio parameters include a multichannel mode, a sampling rate, and the like.

The component layer model illustrated in FIG. 10 indicates component selection information in each of the categories of a video and audio. In the selective layer, it is indicated that one or more components can be selected for each category. Here, it is indicated that there is a component combined using a combination tag between two categories, and the component is selected through category crossing.

In the composite layer, a composition process of components serving as choices in the selective layer is indicated. It is indicated that when there is only one component to be combined, the component is used as a choice in the selective layer without change. In the adaptive layer, the adaptive switching process of components used in the composite layer is indicated. It is indicated that when there is only one component to be switched, the component is constantly selected.

As described above, the receiver 200 performs the component selection based on the component selection information (the component layer model) inserted as the signaling information. An exemplary component selection operation of the receiver 200 will be described.

(1) The receiver 200 acquires the component selection information, and the number of components to be selected among choices is first set, and a component is selected. In this case, when the user is to be allowed to make a selection, a selection GUI is displayed based on the attribute information of the components of the selective layer of the top layer, and the user is allowed to make a selection.

When the terminal is caused to automatically make a selection, the receiver 200 makes a selection based on the attribute information of the components of the selective layer of the top layer, personal information held in the receiver 200, and terminal capability information. Basically, the above process is performed for each component category, but when the combination tag is set, the selection is performed across the categories.

(2) When the component selected in the selective layer includes a plurality of elements, the receiver 200 performs composition and presentation using a plurality of components that are to undergo designated component composition and adaptively switched in the adaptive layer.

(3) When the component selected in the selective layer includes only one element, the receiver 200 performs presentation based on the component adaptively switched in the adaptive layer.

(4) When there is only one component to be switched in the adaptive layer in (2) and (3), the receiver 200 presents the component without switching.

In this embodiment, a component structure table (CST) is introduced so that the broadcast transmission system 110 transmits the component selection information (the component layer model) to the receiver 200. In other words, in this embodiment, a CST is newly introduced into a package access (PA) message of signaling together with an MMT package table (MPT), and thus a 3-layer model of component selection in a broadcasting/communication hybrid multi-component configuration is implemented.

In the CST, each component is identified by a component tag (component_tag) and linked with an asset description (component description) of the MPT. The CST describes a component configuration such as an integrated component corresponding to the selective layer for each component category such as a video or audio and an atomic component corresponding to the composite/adaptive layer for each integrated component, and provides a parameter necessary for selection in each layer through various descriptors.

For example, parameters and descriptors of the respective layers of the CST are as follows.

(A) Overall

As a parameter of this layer, there is a parameter of a default selection policy. The parameter of the default selection policy indicates, for example, any one of application selection, resident automatic selection, resident UI selection, and non-designation.

(B) Component Category

As parameters of this layer, there are parameters of a category type and a component selection policy. The parameter of the category type indicates a video, audio, captions, or the like. The parameter of the component selection policy indicates any one of application selection, resident automatic selection, resident UI selection, and non-designation.

(C) Integrated Component

As parameters of this layer, there are parameters of an integrated component identifier, combination information with other component categories, and configuration information of the atomic component. The parameter of the configuration information of the atomic component indicates whether or not an atomic component of a composite/adaptive target is included.

As additional parameters of this layer, there are parameters of a default selected integrated component, an integrated component having a high priority at the time of emergency, and a CA type. The parameter of the CA type indicates combination information of paid/free and encryption/non-encryption in the integrated component.

As descriptors of this layer, there are an integrated video component descriptor, an integrated audio component descriptor, a target device descriptor, a target region descriptor, a view point descriptor, and a parental rating descriptor. The integrated video component descriptor indicates selection information of a video component, for example, the resolution or the like. The integrated audio component descriptor indicates selection information of an audio component, for example, a channel configuration or the like.

The target device descriptor designates a presentation target device of the integrated component. The target region descriptor designates a use target region of the integrated component. The view point descriptor indicates a view point identification of the integrated component. The parental rating descriptor indicates rating information.

(D) Atomic Component

As parameters of this layer, there are parameters of an atomic component identifier and an atomic component type. The parameter of the atomic component identifier is a component tag. The parameter of the atomic component type indicates any one of adaptive, composite, and (adaptive+ composite).

As descriptors of this layer, there are an adaptive switch descriptor and a composite component type descriptor. The adaptive switch descriptor indicates information necessary for adaptive switching such as a priority or a rate. The composite component type descriptor indicates a composite component type or the like.

Figure 11:
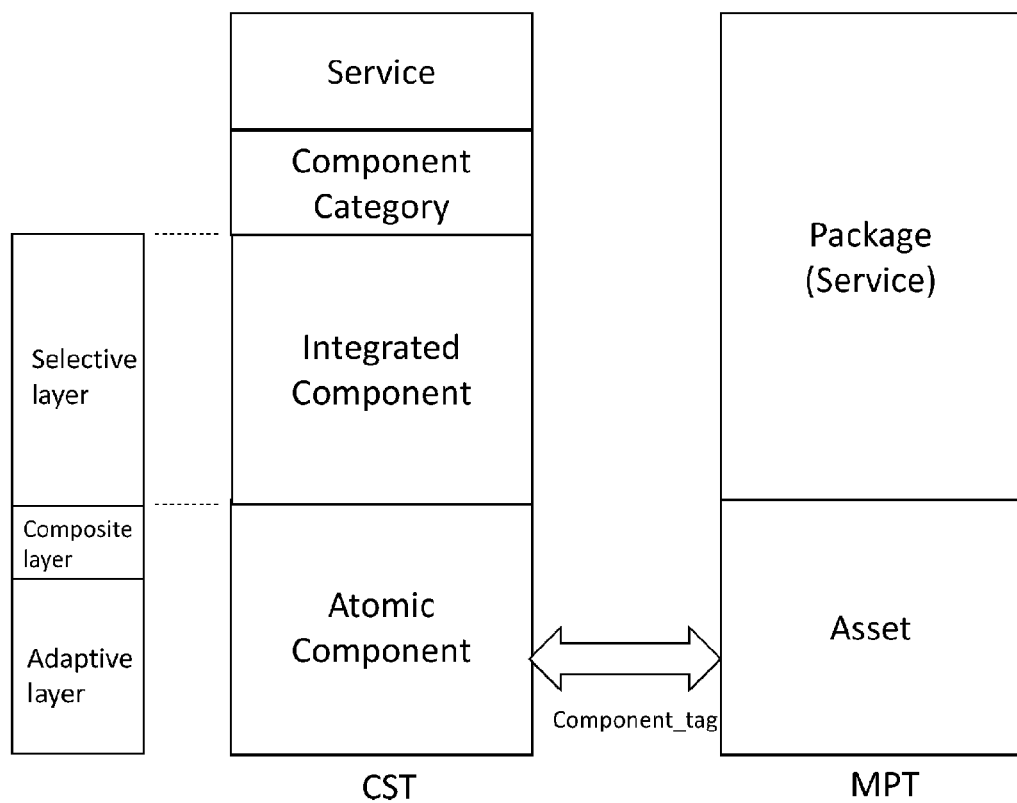
FIG. 11 is a diagram illustrating a correspondence relation of an adaptive layer, a composite layer, and an adaptive layer in a component layer model and an integrated component and an atomic component in a component structure table (CST).

FIG. 11 illustrates a correspondence relation between the adaptive layer, the composite layer, and the adaptive layer in the component layer model and the integrated component and the atomic component in the CST. FIG. 11 illustrates that the asset description (component description) of the MPT is linked with the component of the CST.

Figure 12:
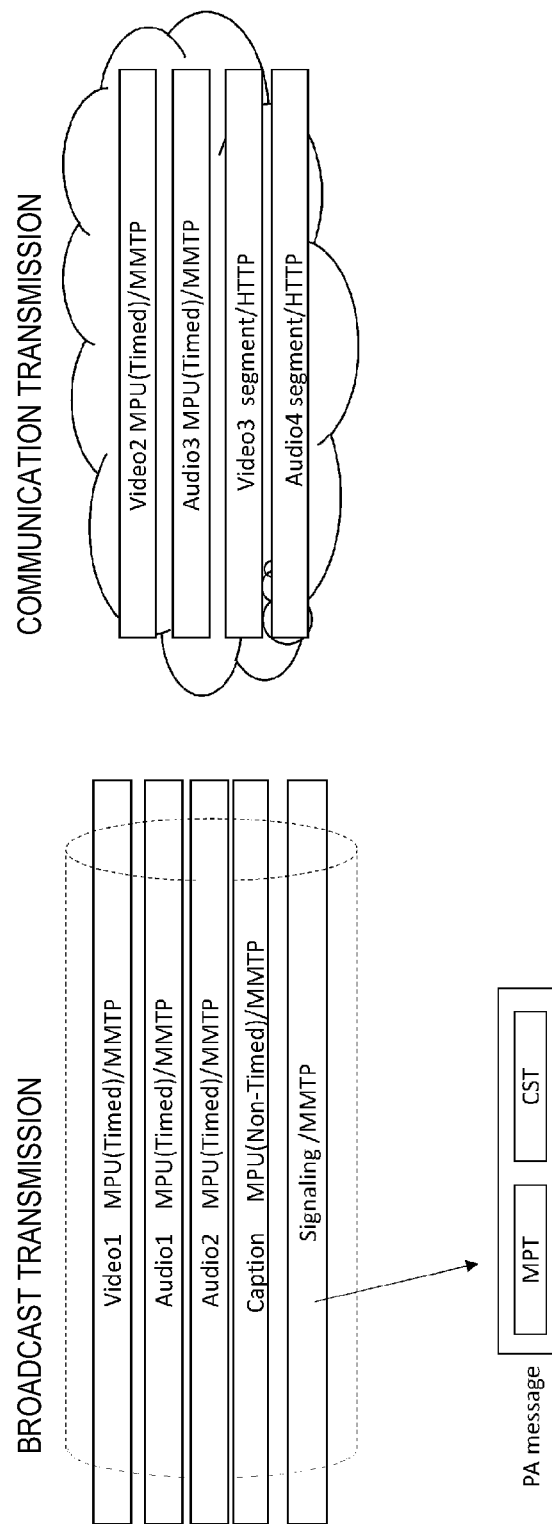
FIG. 12 is a diagram illustrating an example of a signal configuration assumed in a broadcasting/communication hybrid system.

FIG. 12 illustrates an example of a signal configuration assumed in the broadcasting/communication hybrid system 10 of FIG. 1. In FIG. 12, in broadcast transmission, using the MMT packet, a video 1 (Video1), audio 1 (Audio1), audio 2 (Audio2), and captions (Caption) are transmitted, and signaling is transmitted. As one of signaling, there is the PA message, and the tables such as the MPT and the CST are inserted into the PA message. In FIG. 12, in communication transmission, a video 2 (Video2) and audio 3 (Audio3) are transmitted using the MMT packet, and a video 3 (Video3) and audio 4 (Audio4) are transmitted using an HTTP packet.

Next, the MPT will be described. As the MMT packet, as described above, there is also an MMT packet in which a signaling message is included in a payload. As one of such signaling messages, there is a PA message including the MPT. The MPT indicates a component (asset) that constitutes one broadcast service.

Figure 13:
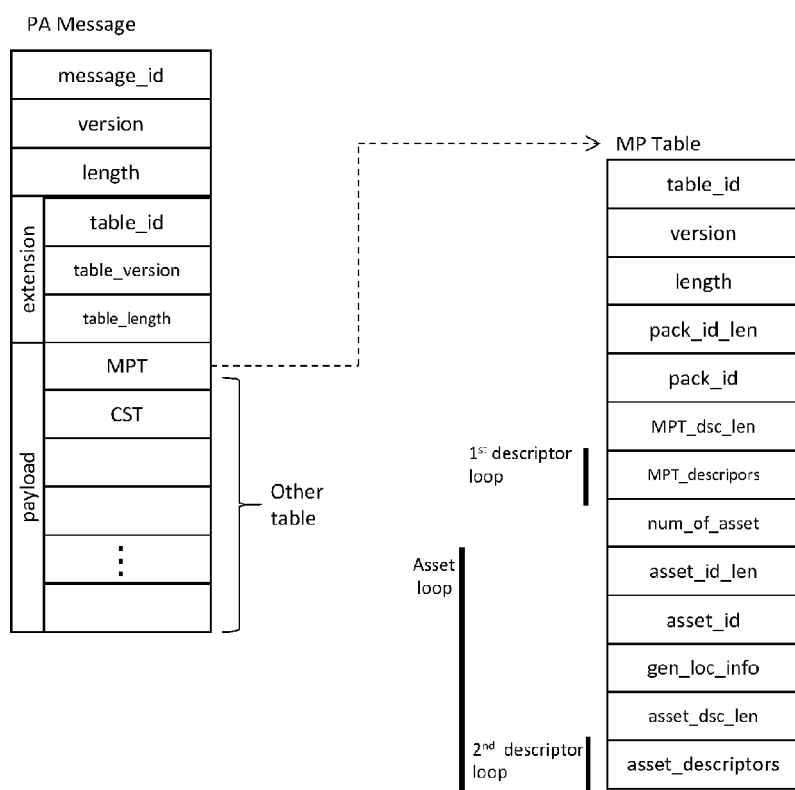
FIG. 13 is a diagram schematically illustrating exemplary configurations of a package access (PA) message and an MMT package (MP) table (MPT).

FIG. 13 schematically illustrates exemplary configurations of the PA message and the MPT. FIG. 14 illustrates a description of main parameters of the PA message, and FIG. 15 illustrates a description of main parameters of the MPT.

"message_id" is a fixed value identifying the PA message in various kinds of signaling information. "version" is an 8-bit integer value indicating a version of the PA message. For example, when some parameters constituting the MPT are updated, it is incremented by +1. "length" is the number of bytes indicating the size of the PA message which is counted directly after this field.

In an "extension" field, index information of a table arranged in a payload field is arranged. In this field, fields of "table_id," "table_version," and "table_length" are arranged by the number of tables. "table_id" is a fixed value identifying a table. "table_version" indicates a version of a table. "table_length" is the number of bytes indicating the size of a table.

In the payload field of the PA message, the MPT and a predetermined number of other tables (here, at least the CST) are arranged. Next, a configuration of the MPT will be described.

"table_id" is a fixed value identifying the MPT in various kinds of signaling information. "version" is an 8-bit integer value indicating a version of the MPT. For example, when some parameters constituting the MPT are updated, it is incremented by +1. "length" is the number of bytes indicating the size of the MPT which is counted directly after this field.

"pack_id" is identification information of the entire package in which all signals and files transmitted through a broadcast signal are set as components. The identification information is text information. "pack_id_len" indicates the size of the text information (the number of bytes). An "MPT_descripors" field is a storage region of a descriptor related to the entire package. "MPT_dsc_len" indicates the size of the field (the number of bytes).

"num_of_asset" indicates the number of assets (signals and files) serving as an element constituting a package. The following asset loops are arranged according to the number. "asset_id" is information (an asset ID) identifying an asset uniquely. The identification information is text information. "asset_id_len" indicates the size of the text information (the number of bytes). "gen_loc_info" is information indication a location of an asset acquisition destination. An "asset_descriptors" field is a storage region of a descriptor related to an asset. "asset_dsc_len" indicates the size of the field (the number of bytes).

FIG. 16 illustrates an exemplary structure (syntax) of the PA message. FIG. 17 illustrates an exemplary structure (syntax) of the MPT.

Next, the CST will be described. FIG. 18 to FIG. 20 illustrate an exemplary structure (syntax) of the CST. "table_id" is a fixed value identifying the CST in various kinds of signaling information. "version" is an 8-bit integer value indicating a version of the CST. For example, when some parameters constituting the CST are updated, it is incremented by +1. "length" is the number of bytes indicating the size of the CST which is counted directly after this field.

A 4-bit field of "default_selection_policy" indicates a default selection policy. In other words, the "default_selection_policy" indicates how the component selection related to the selective layer is performed. For example, "0" indicates that the selection is performed through an application of HTML 5, "1" indicates that the selection is performed by the user using the GUI, and "2" indicates that the selection is automatically performed by the terminal (the receiver).

In this case, the component selection is roughly divided into two selections, that is, the application selection and the resident selection. The application selection indicates selection by an application (software) provided by a broadcaster, and the resident selection indicates selection by software specific to the receiver. The resident selection is performed such that automatic selection is performed, that is, selection is automatically performed by the receiver according to the attribute or such that the choices are displayed and selected by the user. The application selection is performed in one of two methods, that is, either selection is automatically performed by an application or choices are displayed and selected by the user, but it is not particularly distinguished since both two methods are included in a range expressed in an application.

An 8-bit field of "no_of_component_category" indicates the number of component categories. Here, the category is a video, audio, or the like. A part subsequent to this field is a for loop and indicates information of each component category.

A 4-bit field of "category_type" indicates a category type such as a video or audio. A 4-bit field of "component_selection_policy" indicates a component selection policy. A selection policy of each component category can be set through this field. If "default_selection_policy" is acceptable, following "default_selection_policy" is indicated by setting the same values or either of all "1s" and all "0s" as a value of "component_selection_policy."

An 8-bit field of "no_of_integrated_component" indicates the number of integrated components. A part subsequent to this field is a for loop and indicates information of each integrated component.

An 8-bit field of "integrated_component_id" indicates an identifier (ID) of the integrated component. An 8-bit field of "combination_tag" indicates a combination tag serving as an identifier of a combination selected through the category crossing. A 1-bit field of "composite_flag" indicates a composition flag. For example, "1" indicates that composition of the atomic component is included. A 1-bit field of "adaptive_flag" indicates an adaptive switching flag. For example, "1" indicates that adaptive switching of the atomic component is included.

A 1-bit field of "default_flag" is a default flag indicating whether or not it is a default selection target. For example, "1" indicates a default selection target. A 1-bit field of "emergency_flag" indicates whether or not it is an integrated component for emergency. For example, "1" indicates an integrated component for emergency. A 2-bit field of "conditional_access_type" is a conditional access flag indicating paid/free and encryption/non-encryption. In this case, for example, one of two bits indicates paid/free, and the remaining one bit indicates encryption/non-encryption.

An "integrated_comp_descriptors_byte" field is a description region for the integrated component. A 16-bit field of "integrated_comp_descriptors_length" indicates the size of the description region for the integrated component. A level of the integrated component, that is, various parameters necessary for selection in the selective layer are embedded in the description region for the integrated component as a descriptor.

An 8-bit field of "no_of_atomic_component" indicates the number of atomic components (unit components) expanded under the integrated component. For example, in FIG. 10, each component described in the adaptive layer is the atomic component. A part subsequent to this field is a for loop and indicates information of each atomic component.

A 16-bit field of "component_tag" indicates a component tag. Through this component tag, the atomic component is linked with an asset description (component description) of the MPT. A 2-bit field of "atomic_component_type" indicates a type of atomic component.

For example, "00" indicates a "single" type. The "single" type indicates an atomic component that is subject to neither the adaptive switching in the adaptive layer nor the composition with other components in the composite layer but becomes an integrated component without change. For example, in the mode example of FIG. 10, a component indicated by an arrow a corresponds to this type.

For example, "01" indicates a "composite" type. The "composite" type indicates an atomic component that is subject to the composition with other components in the composite layer and becomes an integrated component without being subject to the adaptive switching in the adaptive layer. For example, in the mode example of FIG. 10, a component indicated by an arrow b corresponds to this type.

For example, "10" indicates an "adaptive" type. The "adaptive" type indicates an atomic component that becomes an integrated component without change without being subject to the composition with other components in the composite layer when it is selected by the adaptive switching in the adaptive layer. For example, in the mode example of FIG. 10, a component indicated by an arrow c corresponds to this type.

For example, "11" indicates a "composite+adaptive" type. The "composite+adaptive" type indicates an atomic component that is subject to the composition with other components in the composite layer and becomes an integrated component when it is selected by the adaptive switching in the adaptive layer. For example, in the mode example of FIG. 10, a component indicated by an arrow d corresponds to this type.

An "atomic_comp_descriptors_byte" field is a descriptor region for the atomic component. An 8-bit field of "atomic_comp_descriptors_length" indicates the size of the descriptor region for the atomic component. A level of the atomic component, that is, various parameters necessary for selection and composition in the adaptive layer and in the composite layer, are embedded in the descriptor region for the atomic component as a descriptor.

Next, the descriptor embedded in the description region for the integrated component, that is, the integrated component descriptor, will be described. In this embodiment, as the integrated component descriptor, the integrated video component descriptor, the integrated audio component descriptor, the target device descriptor, the target region descriptor, the view point descriptor, and the parental rating descriptor are assumed.

The integrated video component descriptor is a descriptor describing selection information related to a video such as a resolution, a frame rate, and a 3D parameter. The integrated audio component descriptor is a descriptor describing selection information related to an audio such as multichannel and sampling frequency. The target device descriptor is a descriptor describing device information of a target that reproduces a corresponding component.

The target region descriptor is a descriptor describing information indicating a region of a target that reproduces a corresponding component. The view point descriptor is a descriptor describing meta information related to a view of a video. The parental rating descriptor is a descriptor describing rating information of a corresponding component.

FIG. 21 illustrates an exemplary structure (syntax) of the integrated video component descriptor. A 16-bit field of "descriptor_tag" indicates a descriptor tag. Here, "descriptor_tag" indicates the integrated video component descriptor. An 8-bit field of "descriptor_length" indicates a descriptor length and indicates the number of bytes subsequent to this field.

A 1-bit field of "basic_format_flag" is a basic format flag and indicates whether or not there is a description of a basic format. For example, "1" indicates that there is a description of a basic format. A 1-bit field of "3D_format_flag" is a 3D format flag and indicates whether or not there is a description of a 3D format. For example, "1" indicates that there is a description of a 3D format.

A 1-bit field of "language_code_flag" is a language flag and indicates whether or not there is a description of a language. For example, "1" indicates that there is a description of a language. A 1-bit field of "specific_video_flag" is a specific video flag, and indicates whether or not there is a description of a specific video type. For example, "1" indicates that there is a description of a specific video type.

When "basic_format_flag" is "1," there is a description of a basic format as follows. A 4-bit field of "video_resolution" indicates the resolution in the vertical direction. For example, "1" indicates "180," "2" indicates "240," "3" indicates "480," "4" indicates "720," "5" indicates "1080," "6" indicates "2160," and "7" indicates "4320."

A 4-bit field of "video_aspect_ratio" indicates an aspect ratio. For example, "1" indicates "4:3," "2" indicates "16:9 with a pan vector (PV)," "3" indicates "16:9 with no PV," and "4" indicates "16:9 or more." A 1-bit field of "video_scan_flag" indicates a scan flag. For example, "0" indicates interlaced, and "1" indicates progressive.

A 5-bit field of "video_frame_rate" indicates a frame rate. For example, "4" indicates "25 frames," "5" indicates "30/1.001 frames," "6" indicates "30 frames," "7" indicates "50 frames," "8" indicates "60/1.001 frames," and "9" indicates "60 frames."

When "3D_format_flag" is "1," there is a description of a 3D format type. An 8-bit field of "3D_format_type" indicates a 3D format type. For example, "1" indicates "stereo/side by side scheme," and "2" indicates a "stereo/top and bottom scheme."

When "language_code_flag" is "1," there is a description of a language code. A 24-bit field of "ISO_639_language_code" indicates a language code. When "specific_video_flag" is "1," there is a description of a specific video type. An 8-bit field of "specific_video_type" indicates a specific video type. For example, "1" indicates a sign language video.

FIG. 22 illustrates an exemplary structure (syntax) of the integrated audio component descriptor. A 16-bit field of "descriptor_tag" indicates a descriptor tag. Here, "descriptor_tag" indicates the integrated audio component descriptor. An 8-bit field of "descriptor_length" indicates a descriptor length and indicates the number of bytes subsequent to this field.

A 1-bit field of "basic_format_flag" is a basic format flag and indicates whether or not there is a description of a basic format. For example, "1" indicates that there is a description of a basic format. A 1-bit field of "language_code_flag" is a language flag and indicates whether or not there is a description of a language. For example, "1" indicates that there is a description of a language. A 1-bit field of "specific_audio_flag" is a specific audio flag and indicates whether or not there is a description of a specific audio type. For example, "1" indicates that there is a description of a specific audio type.

A 1-bit field of "ES_multi-lingual_flag" indicates an ES multi-lingual flag. For example, "1" indicates that two-language multiplexing is performed in a dual mono. A 1-bit field of "robust_level" indicates a level of robustness. For example, "0" indicates normal robustness, and "1" indicates high robustness.

When "basic_format_flag" is "1," there is a description of a basic format as follows. An 8-bit field of "multichannel_mode" indicates a multichannel mode. For example, "1" indicates "single mono," "2" indicates "dual mono," and "17" indicates "22.2 channels."

A 2-bit field of "quality_indicator" indicates an audio quality indicator. For example, "1" indicates "mode 1," "2" indicates "mode 2," and "3" indicates "mode 3." A 3-bit field of "sampling rate" indicates a sampling frequency. For example, "1" indicates "16 kHz," "2" indicates "22.05 kHz," "3" indicates "24 kHz," "5" indicates "32 kHz," "6" indicates "44.1 kHz," and "7" indicates "48 kHz."

When "language_code_flag" is "1," there is a description of a language code. A 24-bit field of "ISO_639_language_code" indicates a language code. When "ES_multi-lingual_flag" is "1, it indicates that there is a 24-bit field of "ISO_639_language_code_2," and it is a language code 2.

When "specific_audio_flag" is "1." there is a description of a specific audio type. An 8-bit field of "specific_audio_type" indicates a specific audio type. For example, "1" indicates "for qualification-impaired person," and "2" indicates "for hearing-impaired person."

FIG. 23 illustrates an exemplary structure (syntax) of the target device descriptor. A 16-bit field of "descriptor_tag" indicates a descriptor tag. Here, "descriptor_tag" indicates the target device descriptor. An 8-bit field of "descriptor_length" indicates a descriptor length and indicates the number of bytes subsequent to this field.

An 8-bit field of "number_of_taget_device" indicates the number of target devices. For each target device, there is an 8-bit field of "target_device_type" which indicates a target device type. For example, "target_device_type" indicates a type such as a television with a large screen, a tablet with a small screen, or a smart phone with a smaller screen.

FIG. 24 illustrates an exemplary structure (syntax) of the target region descriptor. A 16-bit field of "descriptor_tag" indicates a descriptor tag. Here, "descriptor_tag" indicates the target region descriptor. An 8-bit field of "descriptor_length" indicates a descriptor length and indicates the number of bytes subsequent to this field.

An 8-bit field of "region_spec_type" indicates a region description method designation. For example, "1" indicates a prefectural region designation. A region designator (region designation data) by a designated description method is described in a "target_region_spec ( )" field.

FIG. 25 illustrates an exemplary structure (syntax) of the view point descriptor. A 16-bit field of "descriptor_tag" indicates a descriptor tag. Here, "descriptor_tag" indicates the view point descriptor. An 8-bit field of "descriptor_length" indicates a descriptor length and indicates the number of bytes subsequent to this field.

An 8-bit field of "view_tag" indicates a view tag serving as identification information of video content. There are cases in which the video content is the same, but a rate and a codec are different. When the view tag is the same, it indicates that the video content is the same. Character string data of a view name serving as a name of video content is arranged in a "view_name_byte" field.

FIG. 26 illustrates an exemplary structure (syntax) of the parental rating descriptor. A 16-bit field of "descriptor_tag" indicates a descriptor tag. Here, "descriptor_tag" indicates the parental rating descriptor. An 8-bit field of "descriptor_length" indicates a descriptor length and indicates the number of bytes subsequent to this field.

A rating can be designated for each country. A 24-bit field of "country_code" indicates a country code. An 8-bit field of "rating" indicates a rating. "rating+age of 3" indicates a minimum age.

Next, the descriptor embedded in the descriptor region for the atomic component, that is, the atomic component descriptor, will be described. In this embodiment, the adaptive switch descriptor and the composite component type descriptor are assumed as the atomic component descriptor. The adaptive switch descriptor is a descriptor describing selection information for adaptively switching the atomic component. The composite component type descriptor is a descriptor describing information indicating a composite component obtained by combining a plurality of atomic components and a type of composition.

FIGS. 27 and 28 illustrate an exemplary structure (syntax) of the adaptive switch descriptor. A 16-bit field of "descriptor_tag" indicates a descriptor tag. Here, "descriptor_tag" indicates the adaptive switch descriptor. An 8-bit field of "descriptor_length" indicates a descriptor length and indicates the number of bytes subsequent to this field.

A 3-bit field of "path_type" indicates a transmission type. For example, "0" indicates broadcasting, "1" indicates communication (MMT/IP multicast), "2" indicates communication (MMT/UDP/IP), "3" indicates communication (MMT/TCP/IP), and "4" indicates communication (HTTP). A 1-bit field of "default_flag" indicates a default flag. For example, "1" indicates that the atomic component is selected by default, that is, is initially selected.

A 1-bit field of "priority_indicator_flag" indicates a priority designation flag. For example, "1" indicates that there is a priority designation description. A 1-bit field of "bitrate_flag" indicates a bit rate flag. For example, "1" indicates that there is a bit rate description.

A 1-bit field of "video_format_flag" indicates a video format flag. For example, "1" indicates that there is a video format description. A 1-bit field of "audio_format_flag" indicates an audio format flag. For example, "1" indicates that there is an audio format description.

When "priority_indicator_flag" is "1," there is a description of a priority designation. An 8-bit field of "priority_indicator" indicates a priority designation. In this case, a large value indicates a high priority. As a priority increases, a higher quality and a wider band are required. When "bitrate_flag" is "1," there is a description of a bit rate. A 16-bit rate of "bitrate" indicates a bit rate, for example, using units of 10 kbps.

When "video_format_flag" is "1," there is a description of a video format as follows. A 4-bit field of "video_resolution" indicates a resolution. A 4-bit field of "video_aspect_ratio" indicates an aspect ratio. A 1-bit field of "video_scan_flag" indicates a scan flag. A 5-bit field of "video_frame_rate" indicates a frame rate.

When "audio_format_flag" is "1," there is a description of an audio format as follows. An 8-bit field of "multichannel_mode" indicates a multichannel mode. A 2-bit field of "quality_indicator" indicates a quality indicator. A 3-bit field of "sampling_rate" indicates a sampling rate. A 1-bit field of "robust_level" indicates a level of robustness. For example, "0" indicates normal robustness, and "1" indicates high robustness.

FIG. 29 illustrates an exemplary structure (syntax) of the composite component type descriptor. A 16-bit field of "descriptor_tag" indicates a descriptor tag. Here, "descriptor_tag" indicates the composite component type descriptor.

An 8-bit field of "descriptor_length" indicates a descriptor length and indicates the number of bytes subsequent to this field.

An 8-bit field of "composite_component_type" indicates a composite component type. For example, "composite_component_type" indicates a type such as scalable, 3D, tile, layer, or mixing. A 1-bit field of "dependency_flag" indicates a dependency flag. For example, "1" indicates that it is a component depending on another component. When "dependency_flag" is "1," there is a 16-bit field of "dependent_component_tag." This field indicates a dependent target component tag.

FIG. 30 indicates a specific example of an association between the MPT and the CST. This example corresponds to the signal configuration of FIG. 12. The selection information of three component categories, that is, a video (Type=1), audio (Type=2), and captions (Type=3) are included in the CST.

Regarding a video, there are three integrated components. For each integrated component, there is various information including the integrated component descriptor (I.Comp Descriptors), and there is various information including the atomic component descriptor (A.Comp Descriptors) of the atomic component expanded under this integrated component.

In this example, an atomic component expanded under a first integrated component (id=01) is a video 1 (Video1) that is transmitted in a broadcasting manner. An atomic component expanded under a second integrated component (id=02) is a video 2 (Video2) that is transmitted in a communication manner. An atomic component expanded under a third integrated component (id=03) is a video 3 (Video3) that is transmitted in a communication manner.

For audio, there are three integrated components. For each integrated component, there is various information including the integrated component descriptor (I.Comp Descriptors), and there is various information including the atomic component descriptor (A.Comp Descriptors) of the atomic component expanded under this integrated component.

In this example, atomic components expanded under a first integrated component (id=01) are audio 1 (Audio1) and audio 2 (Audio2) that are transmitted in a broadcasting manner. An atomic component expanded under a second integrated component (id=02) is audio 3 (Audio3) that is transmitted in a communication manner. An atomic component expanded under a third integrated component (id=03) is audio 4 (Audio4) that is transmitted in a communication manner.

For captions, there is one integrated component. For this integrated component, there is various information including the integrated component descriptor (I.Comp Descriptors), and there is various information including the atomic component descriptor (A.Comp Descriptors) of the atomic component expanded under this integrated component. In this example, an atomic component is captions 1 (Caption1) that are transmitted in a broadcasting manner.

In the MPT, there is a description of each asset (component). For each asset, information indicating a location of an acquisition destination is inserted into a "General_Location_info ( )" field. Each atomic component of the CST is associated with a corresponding asset description of the MPT using a component tag (Component). Accordingly, it is possible to recognize the acquisition destination in the MPT and acquire each atomic component.

[Configuration of Broadcast Transmission System]

Figure 31:
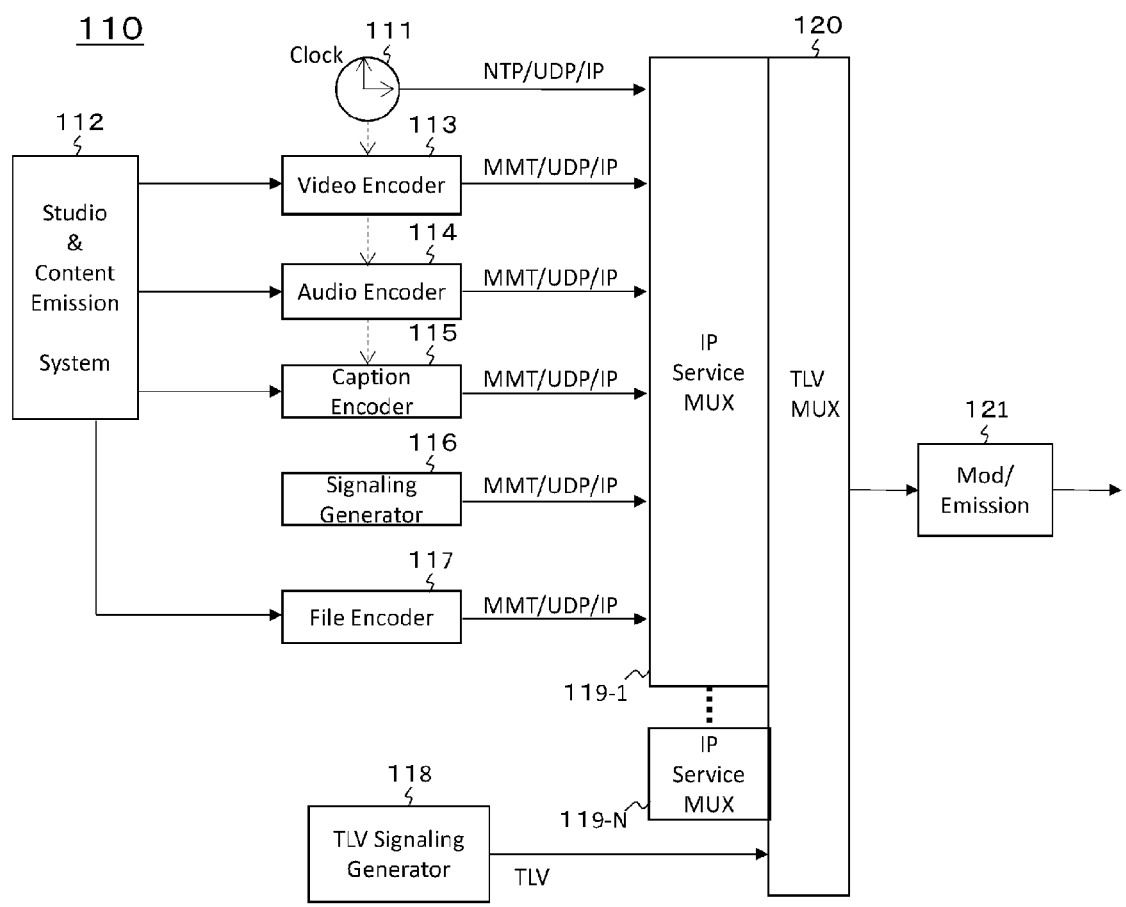
FIG. 31 is a block diagram illustrating an exemplary configuration of a broadcast transmission system constituting a broadcasting/communication hybrid system.

FIG. 31 illustrates an exemplary configuration of the broadcast transmission system 110. The broadcast transmission system 110 includes a clock unit 111, a signal transmitting unit 112, a video encoder 113, an audio encoder 114, a caption encoder 115, a signaling generator 116, and a file encoder 117. The broadcast transmission system 100 further includes a TLV signaling generator 118, N IP service multiplexers 119-1 to 119-N, a TLV multiplexer 120, and a modulating/transmitting unit 121.

The clock unit 111 generates time information (NTP time information) synchronized with time information acquired from an NTP server (not illustrated), and transmits an IP packet including the time information to the IP service multiplexer 119-1. The signal transmitting unit 112 is a studio of a TV station or a recording/reproducing device such as a VTR, and transmits stream data such as a video, audio, or captions serving as the timed media or a file (file data) such as HTML document data serving as the non-timed media to the respective encoders.

The video encoder 113 encodes a video signal transmitted from the signal transmitting unit 112, packetizes the encoded signal, and transmits the IP packet including the MMT packet of the video to the IP service multiplexer 119-1. The audio encoder 114 encodes an audio signal transmitted from the signal transmitting unit 112, packetizes the encoded signal, and transmits the IP packet including the MMT packet of the audio to the IP service multiplexer 119-1.

The caption encoder 115 encodes a caption signal transmitted from the signal transmitting unit 112, packetizes the encoded signal, and transmits the IP packet including the MMT packet of the caption to the IP service multiplexer 119-1. The file encoder 117 combines or divides the file (file data) transmitted from the signal transmitting unit 112 as necessary, generates the MMT packet including the file, and transmits the IP packet including the MMT packet to the IP service multiplexer 119-1.

The signaling generator 116 generates a signaling message, and transmits the IP packet including the MMT packet in which the signaling message is arranged in the payload portion to the IP service multiplexer 119-1. In this case, the signaling generator 116 arranges the CST in the PA message together with the MPT (see FIGS. 13 to 20).

The IP service multiplexer 119-1 performs time-division multiplexing on the IP packets transmitted from the respective encoders. At this time, the IP service multiplexer 119-1 generates TLV packets by adding the TLV header to the IP packets.

The IP service multiplexer 119-1 constitutes one channel part included in one transponder. The IP service multiplexers 119-2 to 119-N have the same function as the IP service multiplexer 119-1 and constitute other channel parts included in one transponder.

The TLV signaling generator 118 generates signaling information, and generates a TLV packet in which the signaling information is arranged in a payload portion. The TLV multiplexer 120 multiplexes the TLV packets generated by the IP service multiplexers 119-1 to 119-N and the TLV signaling generator 118, and generates a broadcast stream. The modulating/transmitting unit 121 performs an RF modulation process on the broadcast stream generated by the TLV multiplexer 120, and transmits a resulting stream to an RF transmission path.

An operation of the broadcast transmission system 110 illustrated in FIG. 31 is briefly described. The clock unit 111 generates the time information synchronized with the time information acquired from an NTP server, and generates the IP packet including the time information. The IP packet is transmitted to the IP service multiplexer 119-1.

The video signal transmitted from the signal transmitting unit 112 is supplied to the video encoder 113. The video encoder 113 encodes the video signal, packetizes the encoded signal, and generates the IP packet including the MMT packet of the video. The IP packet is transmitted to the IP service multiplexer 119-1. A similar process is performed on the audio signal transmitted from the signal transmitting unit 112. Then, the IP packet including the MMT packet of the audio generated by the audio encoder 114 is transmitted to the IP service multiplexer 119-1.

The file transmitted from the signal transmitting unit 112 is supplied to the file encoder 117. The file encoder 117 combines or divides the file as necessary, generates the MMT packet including the file, and further generates the IP packet including the MMT packet. The IP packet is transmitted to the IP service multiplexer 119-1.

A similar process is performed on the audio signal and the caption signal transmitted from the signal transmitting unit 112. Then, the IP packet including the MMT packet of the audio generated by the audio encoder 114 is transmitted to the IP service multiplexer 119-1, and the IP packet including the MMT packet of the caption generated by the caption encoder 115 is transmitted to the IP service multiplexer 119-1.

The signaling generator 116 generates the signaling message, and generates the IP packet including the MMT packet in which the signaling message is arranged in the payload portion. The IP packet is transmitted to the IP service multiplexer 119-1. At this time, the CST is arranged in the PA message together with the MPT.

The IP service multiplexer 119-1 performs time-division multiplexing on the IP packets transmitted from the respective encoders and the signaling generator 116. At this time, the TLV header is added to the IP packets to generate the TLV packets. The IP service multiplexer 119-1 processes one channel part included in one transponder, and the IP service multiplexers 119-2 to 119-N similarly process other channel parts included in one transponder.

The TLV packets obtained by the IP service multiplexers 119-1 to 119-N are transmitted to the TLV multiplexer 120. The TLV packet in which the signaling information is arranged in the payload portion is also transmitted from the TLV signaling generator 118 to the TLV multiplexer 120.

The TLV multiplexer 120 multiplexes the TLV packets generated by the IP service multiplexers 119-1 to 119-N and the TLV signaling generator 118, and generates the broadcast stream. The broadcast stream is transmitted to the modulating/transmitting unit 121. The modulating/transmitting unit 121 performs the RF modulation process on the broadcast stream, and transmits the RF modulated signal to the RF transmission path.

[Configuration of Receiver]

Figure 32:
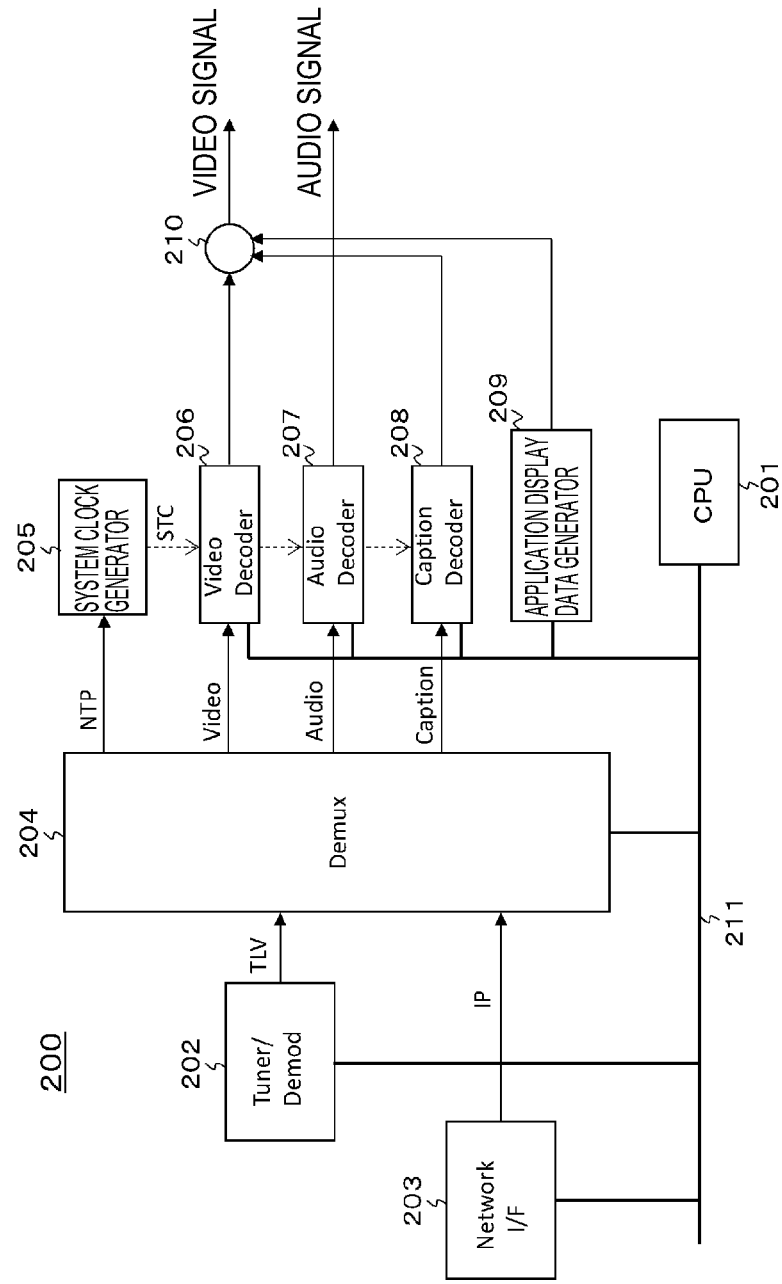
FIG. 32 is a block diagram illustrating an exemplary configuration of a receiver constituting a broadcasting/communication hybrid system.

FIG. 32 illustrates an exemplary configuration of the receiver 200. The receiver 200 includes a CPU 201, a tuner/demodulating unit 202, a network interface unit 203, a demultiplexer 204, and a system clock generator 205. The receiver 200 further includes a video decoder 206, an audio decoder 207, a caption decoder 208, an application display data generator 209, and a combining unit 210.

The CPU 201 constitutes a control unit, and controls operations of the respective units of the receiver 200. The tuner/demodulating unit 202 receives the RF modulated signal, performs a demodulation process, and obtains a broadcast stream. The network interface unit 203 receives a transmission stream of a service delivered from the delivery server 120 via the communication network 300.

The demultiplexer 204 performs a demultiplexing process and a depacketization process on the broadcast stream obtained by the tuner/demodulating unit 202 and the transmission stream obtained by the network interface unit 203, and outputs the NTP time information, the signaling information, the encoded video and audio signals, and the file (file data). Here, for example, the file constitutes data broadcast content.

The system clock generator 205 generates a system clock STC synchronized with the time information based on the NTP time information obtained by the demultiplexer 204. The video decoder 206 decodes the encoded video signal obtained by the demultiplexer 204, and obtains a baseband video signal. The audio decoder 207 decodes the encoded audio signal obtained by the demultiplexer 204, and obtains a baseband audio signal. Further, the caption decoder 208 decodes the encoded caption signal obtained by the demultiplexer 204, and obtains a caption display signal.

The application display data generator 209 obtains a data broadcast display signal based on the file (file data) obtained by the demultiplexer 204 under control of the CPU 201. Files of the same content are repeatedly transmitted through the broadcast stream. The CPU 201 controls a filtering operation in the demultiplexer 204 such that the demultiplexer 204 acquires only a necessary file.

The CPU 201 controls decoding timings of the respective decoders based on a presentation timestamp (PTS) (presentation time information) such that video and audio presentation timings are adjusted. The combining unit 210 combines the baseband video signal obtained by the video decoder 206 with the caption display signal and the data broadcast display signal, and obtains a video signal for video display. An audio signal for audio output is obtained based on the baseband audio signal obtained by the audio decoder 207.

An operation of the receiver 200 illustrated in FIG. 32 will be briefly described. The tuner/demodulating unit 202 receives the RF modulated signal transmitted via the RF transmission path, performs the demodulation process, and obtains the broadcast stream. The broadcast stream is transmitted to the demultiplexer 204. The network interface unit 203 receives the transmission stream of the service delivered from the delivery server 120 via the communication network 300, and transmits the transmission stream to the demultiplexer 204.

The demultiplexer 204 performs the demultiplexing process and the depacketization process on the broadcast stream transmitted from the tuner/demodulating unit 202 and the transmission stream transmitted from the network interface unit 203, and extracts the NTP time information, the signaling information, the video and audio encoded signals, and the file (file data) constituting the data broadcast content.

Various kinds of signaling information extracted by the demultiplexer 204 are transmitted to the CPU 201 via a CPU bus 211. The signaling information includes TLV-SI and MMT-SI. As described above, the TLV-SI is the transmission control signal (TLV-NIT/AMT) arranged above the TLV transmission packet, and the MMT-SI is the signaling message serving as the signaling information included in the payload portion of the MMT packet (see FIG. 2). The CPU 201 controls the operations of the respective units of the receiver 200 based on the signaling information.

The NTP time information extracted by the demultiplexer 204 is transmitted to the system clock generator 205. The system clock generator 205 generates the system clock STC synchronized with the time information based on the NTP time information. The system clock STC is supplied to the video decoder 206, the audio decoder 207, and the caption decoder 208.

The encoded video signal extracted by the demultiplexer 204 is transmitted to and decoded by the video decoder 206, so that the baseband video signal is obtained. The encoded caption signal extracted by the demultiplexer 204 is transmitted to and decoded by the caption decoder 208, so that the caption display signal is obtained.

The file extracted by the demultiplexer 204 is transmitted to the CPU 201 via the CPU bus 211. The CPU 201 analyzes the file, performs a layout process and a rendering process, and instructs the application display data generator 209 to generate display data. The application display data generator 209 generates the data broadcast display signal based on the instruction.

The video signal obtained by the video decoder 206 is supplied to the combining unit 210. The caption display signal obtained by the caption decoder 208 is supplied to the combining unit 210. The display signal generated by the application display data generator 209 is supplied to the combining unit 210. The combining unit 210 combines the signals, and obtains the video signal for video display. The encoded audio signal extracted by the demultiplexer 204 is transmitted to and decoded by the audio decoder 206, so that the baseband audio signal for audio output is obtained.

The receiver 200 selectively acquires the transmission media (component) such as a video and audio to be presented from the reception signal by the broadcasting/communication hybrid transmission based on the component selection information (the component layer model) included in the broadcast signal, that is, the CST arranged in the PA message, and presents an image, audio, and the like.

An overview of a component selection/acquisition process based on the CST/MPT in the receiver 200 will be described. The receiver 200 (the CPU 201) analyzes the CST. In order to select the integrated component in the video component category, the receiver 200 displays the GUI for selection of the user as necessary based on the information such as the descriptor (I.Comp Descriptors) of the integrated component, and allows the user to make a selection.

FIG. 33a illustrates an example of a component selection GUI. The GUI is for allowing the user to perform view selection, language selection, and handicap selection. As illustrated in FIG. 33b, when a view button 401 on the GUI is operated, a drop-down menu for view selection is displayed, and the user can select any one of "display all views," "main," "sub 1," and "sub 2."

As illustrated in FIG. 33c, when a language button 402 on the GUI is operated, a drop-down menu for language selection is displayed, and the user can select any one of, "Japanese," "English," "Chinese," and "Korean." Further, as illustrated in FIG. 33d, when a handicap button 401 on the GUI is operated, a drop-down menu for handicap selection is displayed, and the user can select any one of "vision-impaired person" and "hearing-impaired person."

Further, the receiver 200 automatically selects one or more integrated components according to a capability or a setting. At the time of tuning or at the time of power-on, the receiver 200 automatically selects a default integrated component default component.

When there are a plurality of atomic components in the integrated component, the receiver 200 determines the atomic component that is subject to composition and adaptive switching based on information such as the atomic component descriptor (A.Comp Descriptors).

The receiver 200 determines an asset having a corresponding component tag from the CST with reference to the MPT based on the component tag of the atomic component. Then, the receiver 200 recognizes the acquisition destination (the MMT packet of broadcasting/communication and the file on the communication network) designated by the "General location Info ( )" field of the asset description of the MPT, and acquires and reproduces signal data.

The above description has been made in connection with the video, but a similar process is performed on audio, captions, and the like.

A use case of the component selection/acquisition process based on the CST/MPT in the receiver 200 will be described. The use case is a multiview example as illustrated in FIG. 34. In the multiview example, one program is configured of three pieces of "video+audio," that is, main view/sub view 1/sub view 2.

The main view video is a video displayed when tuning is performed by default, and a video with a resolution (4K) of 3840*2160 or a resolution (2K) of 1920*1080 is assumed to be automatically selected according to a capability of the receiver. In the case of 4K, scalable coding of combining a 2K video signal (base) and a differential signal (extended) is performed. The 2K video signal is transmitted in a broadcasting manner, but the differential signal is transmitted via a network while adaptively switching several rates by adaptive streaming.

For an audio associated with the main video, 22.2 ch or a stereo is assumed to be automatically selected according to a capability and a connection environment of the receiver. In the case of 22.2 ch, scalable coding of combining a stereo signal (base) with a differential signal (extended) is performed. For the stereo signal, two broadcasting systems and one streaming system are assumed to be adaptively switched according to a broadcast reception environment. The differential signal is delivered via a network in a streaming manner.

In the sub view 1, each of a video signal and an audio signal is delivered via a network through one system. In the sub view 1, a video signal is a 2K video signal, and an audio signal is a stereo signal. In the sub view 2, signals with several rates and resolutions are adaptively switched and delivered via a network as a video signal, and an audio signal is delivered via a network through one system. In the sub view 2, a video signal is a 2K video signal, and an audio signal is a stereo signal.

Figure 35:
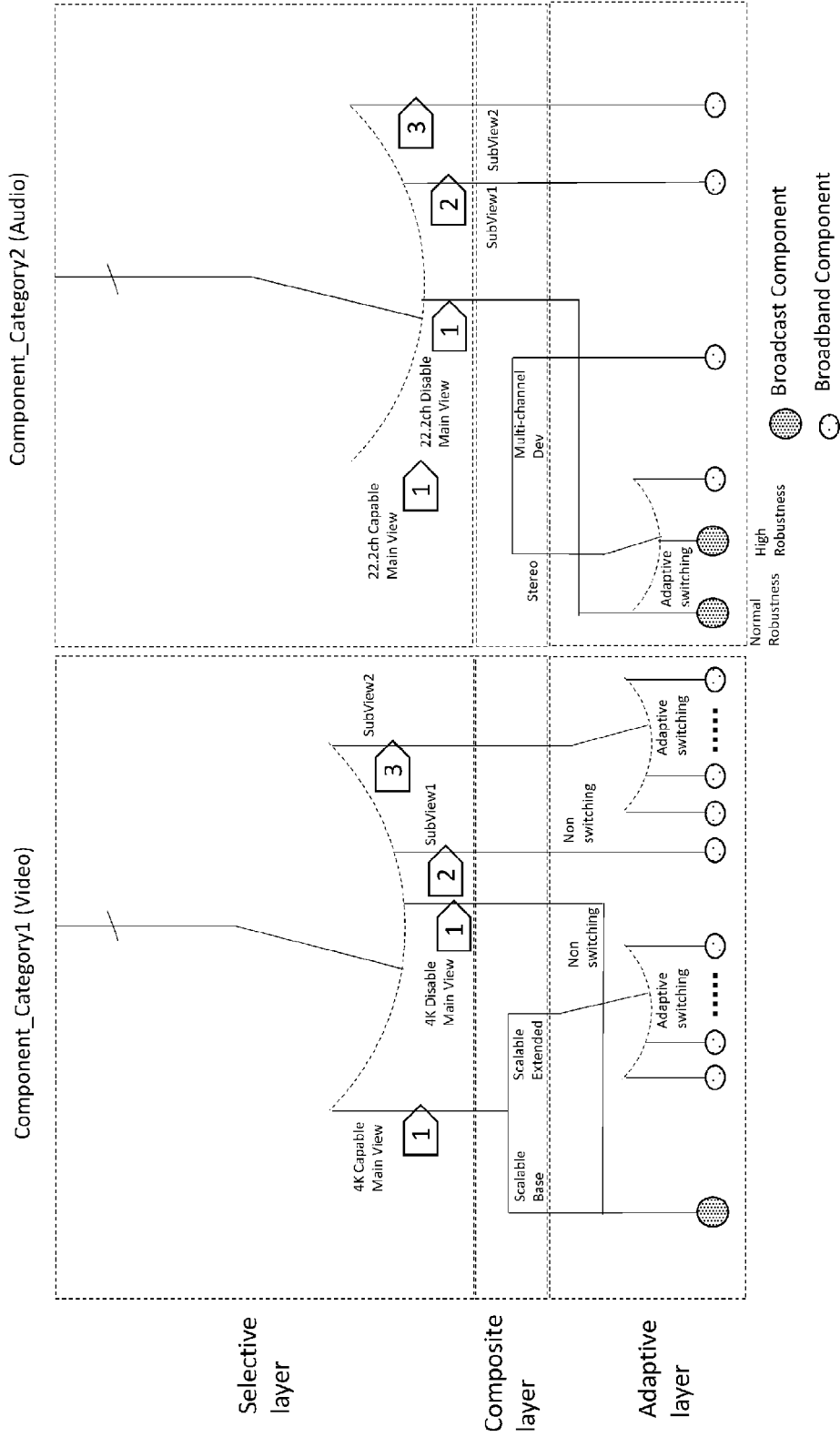
FIG. 35 is a diagram illustrating a component layer model corresponding to a multiview example.

FIG. 35 illustrates a component layer model corresponding to the multiview example. As the component category, there are a video and audio. It is indicated that, in the selective layer of the video, a 4K video signal or a 2K video signal can be selected as a main view, and a sub 1 view and a sub view 2 can be selected.

It is indicated that, in the composite layer and the adaptive layer of the video, the main view (the 4K video signal) serving as a choice in the selective layer is encoded by the scalable coding, and is a composition signal obtained by combining the base signal (the 2K video signal) transmitted in a broadcasting manner with the extended signal (the differential signal) obtained by adaptively switching a plurality of signals transmitted in a communication manner.

It is indicated that, in the composite layer and the adaptive layer of the video, the main view (the 2K video signal) serving as a choice in the selective layer is the base signal (the 2K video signal) transmitted in a broadcasting manner. Further, it is indicated that, in the composite layer and the adaptive layer of the video, the sub view 1 serving as a choice in the selective layer is a video signal transmitted in a communication manner. Further, it is indicated that, in the composite layer and the adaptive layer of the video, the sub view 2 serving as a choice in the selective layer is a video signal obtained by adaptively switching a plurality of video signals transmitted in a communication manner.

It is indicated that, in the selective layer of the audio, the 22.2 ch signal or the stereo signal can be selected as the main view, and the sub 1 view and the sub view 2 can be selected.

It is indicated that, in the composite layer and the adaptive layer of the audio, the main view (the 22.2 ch signal) serving as a choice in the selective layer is one encoded by scalable coding, and is a composition signal of the stereo signal obtained by adaptively switching the signals transmitted through two broadcasting systems and one communication system and the differential signal transmitted in a communication manner.

It is indicated that, in the composite layer and the adaptive layer of the audio, the main view (the stereo signal) serving as a choice in the selective layer is one encoded by scalable coding, and is the stereo signal transmitted in a broadcasting manner. It is indicated that, in the composite layer and the adaptive layer of the audio, each of the sub view 1 and the sub view 2 serving as a choice in the selective layer is the stereo signal transmitted in a communication manner.

It is indicated that, in the selective layer of the video and the audio, the respective views are combined using the combination tag and are selected through the category crossing. In other words, it is indicated that, with the selection of the main view, the sub view 1, and the sub view 2 of the video, the main view, the sub view 1, and the sub view 2 of the audio are selected.

Figure 36:
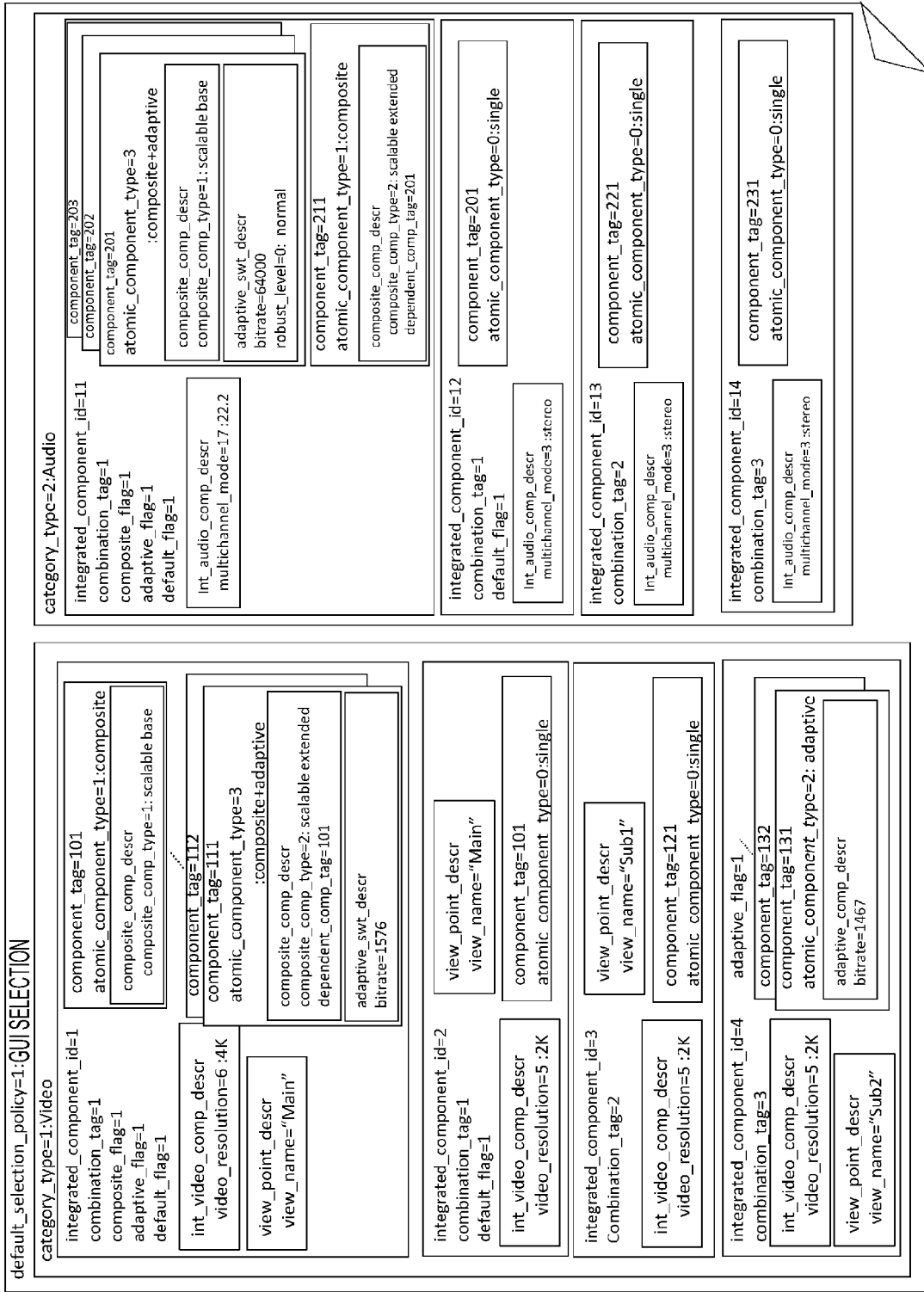
FIG. 36 is a diagram illustrating an exemplary description of a CST corresponding to a multiview example.

FIG. 36 illustrates a description example of the CST corresponding to the multiview example. "default_selection_policy" is set to "1," and it is indicated that the default selection policy is "selected on the GUI by the user." In other words, it is indicated that the view is selected on the GUI by the user.

The selection information of the two component categories of a video (Type=1) and audio (Type=2) is included in the CST. For the video, there are four integrated components, that is, first to fourth integrated components.

The first integrated component (integrated_component_id=1) relates to the main view (the 4K video signal). "combination_tag" is set to "1," and it is indicated that it is selected together with the integrated component of the audio having the same value of "combination_tag" through the category crossing. "composite_flag" is set to "1," and it is indicated that the composition of the atomic component is included. "adaptive_flag" is set to "1," and it is indicated that the adaptive switching of the atomic component is included. Further, "default_flag" is set to "1," and it is indicated that it is a default selection target.

For the first integrated component, there are the integrated video component descriptor (int_video_comp_descr) and the view point descriptor (view_point_descr). In the integrated video component descriptor, for example, "video_resolution" is set to "6," and it is indicated that the resolution in the vertical direction is "2160," that is, 4K. In the view point descriptor, character string data of "Main" is described in "view_name_byte" as a view name.

For the first integrated component, there are a plurality of atomic components that are expanded thereunder. For the atomic component (component_tag=101) indicating the base signal (the 2K video signal) transmitted in a broadcasting manner, "atomic_component_type" is set to "1," and it indicates the atomic component that is not subject to the adaptive switching in the adaptive layer but is subject to the composition with other components in the composite layer and becomes an integrated component.

For the atomic component, there is the composite component type descriptor (composit_comp_decr). In the composite component type descriptor, for example, "composite_component_type" is set to "1," and it indicates a scalable base.

For the atomic components (component_tag=111, 112, . . . ) indicating a plurality of video signals transmitted in a communication manner, when "atomic_component_type" is set to "3," and selection is performed by adaptive switching of the adaptive layer, it indicates the atomic component that is subject to the composition with other components in the composite layer and becomes an integrated component.

For the atomic component, there are the composite component type descriptor (composit_comp_descr) and the adaptive switch descriptor (adaptivw_swt_descr). In the composite component type descriptor, "composite_component_type" is set to "2," and it indicates a scalable extend. In the composite component type descriptor, "dependent_component_tag" is set to "101," and it indicates a dependent target component tag. In the adaptive switch descriptor, a bit rate is described in the "bitrate" field.

The second integrated component (integrated_component_id=2) relates to the main view (the 2K video signal). "combination_tag" is set to "1," and it is indicated that it is selected together with the integrated component of the audio having the same value of "combination_tag" through the category crossing. Further, "default_flag" is set to "1," and it is indicated that it is a default selection target.

For the second integrated component, there are the integrated video component descriptor (int_video_comp_descr) and the view point descriptor (view_point_descr). In the integrated video component descriptor, "video_resolution" is set to "5," and it is indicated that the resolution in the vertical direction is "1080," that is, 2K. In the view point descriptor, character string data of "Main" is described in "view_name_byte" as a view name.

For the second integrated component, there is one atomic component (component_tag=101) that indicates the 2K video signal transmitted in a broadcasting manner and is expanded thereunder. For this atomic component, "atomic_component_type" is set to "0," and it indicates the atomic component that is not subject to neither the adaptive switching in the adaptive layer nor the composition with other components in the composite layer and becomes an integrated component without change.

The third integrated component (integrated_component_id=3) relates to the sub view 1 (the 2K video signal). "combination_tag" is set to "2," and it is indicated that it is selected together with the integrated component of the audio having the same value of "combination_tag" through the category crossing.

For the third integrated component, there are the integrated video component descriptor (int_video_comp_descr) and the view point descriptor (view_point_descr). In the integrated video component descriptor, "video_resolution" is set to "5," and it is indicated that the resolution in the vertical direction is "1080," that is, 2K. In the view point descriptor, character string data of "Sub1" is described in "view_name_byte" as a view name.

For the third integrated component, there is one atomic component (component_tag=121) that indicates the 2K video signal transmitted in a communication manner and is expanded thereunder. For this atomic component, "atomic_component_type" is set to "0," and it indicates the atomic component that is subject to neither the adaptive switching in the adaptive layer nor the composition with other components in the composite layer and becomes an integrated component without change.

The fourth integrated component (integrated_component_id=4) relates to the sub view 2 (the 2K video signal). "combination_tag" is set to "3," and it is indicated that it is selected together with the integrated component of the audio having the same value of "combination_tag" through the category crossing.

For the fourth integrated component, there are the integrated video component descriptor (int_video_comp_descr) and the view point descriptor (view_point_descr). In the integrated video component descriptor, "video_resolution" is set to "5," and it is indicated that the resolution in the vertical direction is "1080," that is, 2K. In the view point descriptor, character string data of "Sub2" is described in "view_name_byte" as a view name.

For the fourth integrated component, there are a plurality of atomic components (component_tag=131, 132, . . . ) that indicate the 2K video signal transmitted in a communication manner and are expanded thereunder. For the atomic components, when "atomic_component_type" is set to "2," and selection is performed by adaptive switching of the adaptive layer, it indicates the atomic component that is not subject to the composition with other components in the composite layer and becomes an integrated component without change.

In the CST, for the audio, there are four integrated components, that is, first to fourth integrated components. The first integrated component (integrated_component_id=11) relates to the main view (the 22.2 ch signal). "combination_tag" is set to "1," and it is indicated that it is selected together with the integrated component of the video having the same value of "combination_tag" by the category crossing.

"composite_flag" is set to "1," and it is indicated that the composition of the atomic component is included. "adaptive_flag" is set to "1," and it is indicated that the adaptive switching of the atomic component is included. Further, "default_flag" is set to "1," and it is indicated that it is a default selection target.

For the first integrated component, there is the integrated audio component descriptor (int_audio_comp_descr). In the integrated audio component descriptor, "multichannel_mode" is set to "17," and it indicates the "22.2 channel."

For the first integrated component, there are a plurality of atomic components that are expanded thereunder. For the atomic components (component_tag=201, 201, 203) indicating the signals (the stereo signals) transmitted through two broadcasting systems and one communication system, when "atomic_component_type" is set to "3," and selection is performed by adaptive switching of the adaptive layer, it indicates the atomic component that is subject to the composition with other components in the composite layer and becomes an integrated component.

For the atomic components (component_tag=201,201, 203), there are the composite component type descriptor (composit_comp_descr) and the adaptive switch descriptor (adaptivw_swt_descr). In the composite component type descriptor, "composite_component_type" is set to "1," and it indicates a scalable base.

In the adaptive switch descriptor, a bit rate is described in the "bitrate" field. In the adaptive switch descriptor related to the atomic component (component_tag=201) indicating one signal transmitted in a broadcasting manner, "robust_level" is set to "1," and it indicates normal robustness. Although not illustrated, in the adaptive switch descriptor related to the atomic component (component_tag=202) indicating the other signal transmitted in a broadcasting manner, "robust_level" is set to "1," and it indicates high robustness.

For the atomic component (component_tag=211) that indicates the signal (the stereo signal) transmitted in a communication manner, "atomic_component_type" is set to "1," which indicates the atomic component that is not subject to the adaptive switching in the adaptive layer but is subject to the composition with other components in the composite layer and becomes an integrated component.

For the atomic component, there is the composite component type descriptor (composit_comp_decr). In the composite component type descriptor, for example, "composite_component_type" is set to "2," and it indicates a scalable extend.

In the composite component type descriptor, "dependent_component_tag" is set to "201," and it indicates a dependent target component tag. Practically, the atomic component of the dependent target is one atomic component adaptively switched among a plurality of atomic components including the atomic component (component_tag=201).

The second integrated component (integrated_component_id=12) relates to the main view (the stereo signal). "combination_tag" is set to "1," and it is indicated that it is selected together with the integrated component of the audio having the same value of "combination_tag" through the category crossing. Further, "default_flag" is set to "1," and it is indicated that it is a default selection target.

For the second integrated component, there is the integrated audio component descriptor (int_audio_comp_descr). In the integrated audio component descriptor, "multichannel_mode" is set to "3," and indicates "stereo."

For the second integrated component, there is one atomic component (component_tag=201) that indicates the stereo signal transmitted in a broadcasting manner and is expanded thereunder. For this atomic component, "atomic_component_type" is set to "0," and it indicates the atomic component that is subject to neither the adaptive switching in the adaptive layer nor the composition with other components in the composite layer and becomes an integrated component without change.

The third integrated component (integrated_component_id=13) relates to the sub view 1 (the stereo signal). "combination_tag" is set to "2," and it is indicated that it is selected together with the integrated component of the video having the same value of "combination_tag" by the category crossing.

For the third integrated component, there is the integrated audio component descriptor (int_audio_comp_descr). In the integrated audio component descriptor, "multichannel_mode" is set to "3," and it indicates "stereo."

For the third integrated component, there is one atomic component (component_tag=221) that indicates the stereo signal transmitted in a communication manner and is expanded thereunder. For this atomic component, "atomic_component_type" is set to "0," and it indicates the atomic component that is subject to neither the adaptive switching in the adaptive layer nor the composition with other components in the composite layer and becomes an integrated component without change.

The fourth integrated component (integrated_component_id=14) relates to the sub view 2 (the stereo signal). "combination_tag" is set to "3," and it is indicated that it is selected together with the integrated component of the video having the same value of "combination_tag" by the category crossing.

For the fourth integrated component, there is the integrated audio component descriptor (int_audio_comp_descr). In the integrated audio component descriptor, "multichannel_mode" is set to "3," and it indicates "stereo."

For the fourth integrated component, there is one atomic component (component_tag=231) that indicates the stereo signal transmitted in a communication manner and is expanded thereunder. For this atomic component, "atomic_component_type" is set to "0," and it indicates the atomic component that is subject to neither the adaptive switching in the adaptive layer nor the composition with other components in the composite layer and becomes an integrated component without change.

Next, an exemplary selection process based on the CST in the receiver 200 will be described. Here, the description will proceed with an example in which display content changes in the order of FIG. 37*a*→FIG. 37*b*→FIG. 37*c*.

FIG. 37*a* illustrates a state when program reproduction is started by a tuning operation. In this state, a default main view is displayed, and the GUI for selection by the user is also displayed since the program supports the multiview. This process will be described below in detail.

(a-1)

The user performs the tuning operation of selecting a broadcast service.

(a-2)

The MPT and the CST are acquired from the selected service stream. Then, a first integrated component (integrated_Component_id=1) and a second integrated component (integrated_Component_id=2) in which "default_flag=1" is set among four integrated components included in a video (category_type=1) are narrowed down. Then, a difference between 4K and 2 is recognized based on the integrated video component descriptor (int_video_comp_descr), and then, since the receiver 200 supports 4K, the first integrated component of 4K is selected.

(a-3)

For the first integrated component, since "composite_flag=1" and "adaptive_flag=1" are set, it is recognized that both the composition and the adaptive switching are included. Then, in the composite component type descriptor (composite_comp_descr) of the included atomic component, one atomic component (component_tag=101) indicating the scalable base is selected from the composite component type (composite_comp_type).

Further, an appropriate atomic component is momentarily selected from a plurality of atomic components (component_tag=111, 112, . . . ) indicating the scalable extend according to a congestion state of a communication path or the like based on the adaptive switch descriptor (adaptive_swt_descr). For the finally selected atomic component, corresponding video stream data is acquired with reference to the MPT based on the component tag (component_tag), the composition process is performed, and a 4K image (a main video) is reproduced.

(a-4)

Then, a first integrated component (integrated_component_id=11) and a second integrated component (integrated_component_id=12) sharing the same "ombination_tag=1" as the first integrated component (Integrated_component_id=1) that is finally selected in the video among four integrated components included in an audio (category_type=1) are narrowed down.

Then, a difference between 22.2 ch and stereo is recognized based on the integrated audio component descriptor (int_video_comp_descr), and then, since the receiver 200 does not support 22.2 ch, the second integrated component (integrated_component_id=12) of stereo is selected.

(a-5)

Since the second integrated component (integrated_component_id=12) includes only one atomic component (component_tag=201), the atomic component is finally selected. For this atomic component, corresponding audio stream data is acquired with reference to the MPT based on the component tag and reproduced.

(a-6)

As a result, the video and the audio of the main view (Main View) set by default are reproduced. Here, since the CST indicates "default_selection_policy=1: GUI selection," a variation in the integrated component serving as the selection target of the user is checked, only view selection is recognized to be entrusted to the user, and the GUI for view selection is displayed.

FIG. 37*b* illustrates a state when the user selects a display of "multiview." In this state, the multiview display for the main view, the sub view 1, and the sub view 2 is performed. This process will be described below in detail.

(b-1)

The user operates the displayed GUI, and selects the display of "multiview" as the view selection.

(b-2)

For the video (category_type=1), a third integrated component (integrated_component_id=3) and a fourth integrated component (integrated_component_id=4) are found as the integrated components corresponding to the sub view 1 and the sub view 2 that are the remaining views excluding the main view that is currently displayed.

(b-3)

Since the third integrated component (integrated_component_id=3) includes only one atomic component (component_tag=121), the atomic component is finally selected. For this atomic component, corresponding video stream data is acquired with reference to the MPT based on the component tag and set as a video of the sub view 1.

(b-4)

For the fourth integrated component (integrated_component_id=4), since "co"adaptive_flag=1" is set, it is recognized that the adaptive switching is included. Further, an appropriate atomic component is momentarily selected from a plurality of atomic components (component_tag=131, 132, . . . ) according to a congestion state of a communication path or the like based on the adaptive switch descriptor (adaptive_swt_descr). For the finally selected atomic component, corresponding video stream data is acquired with reference to the MPT based on the component tag (component_tag) and set as a video of the sub view 2.

(b-5)

The acquired videos of the sub view 1 and the sub view 2 and the video of the main view that is being displayed are decoded, and the three videos are displayed on the screen. The three videos are selected on the GUI, displayed on one large screen, and corresponding audio is reproduced.

(b-6)

Since the selected video is the main view without change, the audio of the atomic component (component_tag=201) is continuously presented, similarly to the state of FIG. 37*a*.

FIG. 37*c* illustrates a state in which the user selects a display of "sub view 1." In this state, the video of the sub view 1 is displayed on the entire screen. This process will be described below in detail.

(c-1)
The user operates the displayed GUI, and selects a display of "sub view 1" as the view selection.
(c-2)
For the video (category_type=1), the third integrated component (integrated_component_id=3) is found as the integrated component corresponding to the sub view 1.
(c-3)
Only the video of the sub view 1 that is displayed in FIG. 37b is displayed on the entire screen, and the component acquisition of the other views ends.
(c-4)
The third integrated component (integrated_component_id=13) is found as the integrated component of the audio having the same "combination_tag=2" as the third integrated component (integrated_component_id=3) of the video.
(c-5)
Since the third integrated component (integrated_component_id=13) includes only one atomic component (component_tag=221), the atomic component is finally selected. For this atomic component, corresponding audio stream data is acquired with reference to the MPT based on the component tag and reproduced.

As described above, in the broadcasting/communication hybrid system 10 illustrated in FIG. 1, the CST including the component selection information is inserted into the PA message together with the MPT. Thus, the reception side 200 can easily select a component such as a video or audio to be presented based on the CST.

2. Modified Examples

In the above embodiment, the CST including the component selection information is inserted into the PA message together with the MPT. However, the receiver 200 may acquire similar content selection information using any other method. For example, similar content selection information may be acquired from a network server associated with the broadcast transmission system 100 through communication.

Additionally, the present technology may also be configured as below.

(1)
A transmission device, including:
a transmission stream generator configured to generate a transmission stream in which a first transmission packet including a predetermined component and a second transmission packet including signaling information related to the predetermined component are multiplexed in a time division manner;
a transmitting unit configured to transmit the transmission stream via a predetermined transmission path; and
an information inserting unit configured to insert component selection information into the second transmission packet.

(2)
The transmission device according to (1),
wherein the component selection information includes selective layer information for performing fixed selection, composite layer information for performing composition, and adaptive layer information for performing dynamic switching from the top.

(3)
The transmission device according to (2),
wherein information for acquiring an acquisition destination is included in information of each component that is selectable in the adaptive layer.

(4)
The transmission device according to any of (1) to (3),
wherein the transmission packet is an MMT packet, and
in the second transmission packet including a package access message, a component structure table including the component selection information is arranged in the package access message together with an MMT package table.

(5)
The transmission device according to (4),
wherein a component of the component structure table is associated with an asset of the MMT package table using a component tag.

(6)
The transmission device according to (4) or (5),
wherein the component selection information includes selective layer information for performing fixed selection, composite layer information for performing composition, and adaptive layer information for performing dynamic switching from the top, and
the component structure table includes selection information of an integrated component serving as the selective layer information and selection information of an atomic component serving as the composite layer information and the adaptive layer information from the top for each component category.

(7)
A transmission method, including:
a transmission stream generation step of generating a transmission stream in which a first transmission packet including a predetermined component and a second transmission packet including signaling information related to the predetermined component are multiplexed in a time division manner;
a transmission stream transmission step of transmitting the transmission stream via a predetermined transmission path by a transmitting unit; and
an information insertion step of inserting component selection information into the second transmission packet.

(8)
A reception device, including:
a first receiving unit configured to receive, via a first transmission path, a transmission stream in which a first transmission packet including a predetermined component and a second transmission packet including signaling information related to the predetermined component are multiplexed in a time division manner; and
a second receiving unit configured to receive a transmission stream in which a third transmission packet including a predetermined component is arranged via a second transmission path,
wherein component selection information is inserted into the second transmission packet, and
the reception device further includes a component selecting unit configured to select a component to be presented based on the component selection information.

(9)
The reception device according to (8),
wherein the component selecting unit causes a selection graphic user interface to be displayed on a screen when there is a variation related to a specific attribute to be selected by a user in the component selection information.

(10)

The reception device according to (8) or (9),
wherein the component selection information includes selective layer information for performing fixed selection, composite layer information for performing composition, and adaptive layer information for performing dynamic switching from the top.

(11)

The reception device according to (10),
wherein information for acquiring an acquisition destination is included in information of each component that is selectable in the adaptive layer.

(12)

The reception device according to any of (8) to (11),
wherein the first transmission path is a broadcast transmission path, and the second transmission path is a network transmission path.

(13)

A reception method, including:
a first reception step of receiving, by a first receiving unit, a transmission stream in which a first transmission packet including a predetermined component and a second transmission packet including signaling information related to the predetermined component are multiplexed in a time division manner; and
a second reception step of receiving, by a second receiving unit, a transmission stream in which a third transmission packet including a predetermined component is arranged via a second transmission path,
wherein component selection information is inserted into the second transmission packet, and
the reception method further includes a component selection step of selecting a component to be presented based on the component selection information.

REFERENCE SIGNS LIST 10 broadcasting/communication hybrid system
110 broadcast transmission system
111 clock unit
112 signal transmitting unit
113 video encoder
114 audio encoder
115 caption encoder
116 signaling generator
117 file encoder
118 TLV signaling generator
119 IP service multiplexer
120 TLV multiplexer
121 modulating/transmitting unit
120 delivery server
200 receiver
201 CPU
202 tuner/demodulating unit
202 demultiplexer
203 network interface unit
204 demultiplexer
205 system clock generator
206 video decoder
207 audio decoder
208 caption decoder
209 application display data generator
210 combining unit
211 CPU bus

The invention claimed is:

1. A television reception device, comprising:
receiving circuitry configured to receive first and second transmission streams that include signaling information and a plurality of components of content, the signaling information including component selection information that specifies a plurality of alternative presentations by identifying a set of alternative components from which the alternative presentations are formed, wherein the set of alternative components includes at least a first component included in the first transmission stream and at least a second component included in the second transmission stream; and
processing circuitry configured to:
cause display of a selection user interface on a display device based on the component selection information,
obtain a user selection using the selection user interface, and
cause a presentation from the plurality of alternative presentations to be presented based on the user selection.

2. The reception device according to claim 1, wherein:
the alternative components are associated with respective values of at least one attribute, and
the selection user interface indicates the respective values of the at least one attribute.

3. The reception device according to claim 2, wherein the at least one attribute includes at least one of a view, a language, a video parameter, an audio parameter, a target region, a target device, a view title, an object, a composition type, a composition position, a path, a bit rate, or a robustness.

4. The reception device according to claim 1, wherein the component selection information includes:
adaptive layer information that specifies one of at least two atomic components,
composite layer information that specifies the one of the plurality of alternative presentations as a combination of the at least two atomic components, and
selective layer information that identifies the plurality of alternative presentations in association with a category identifier indicating the type of content to which the plurality of alternative presentations corresponds.

5. The reception device according to claim 1, wherein the signaling information includes acquisition location information for at least one of the plurality of components.

6. The reception device according to claim 1, wherein the first transmission stream is received via a broadcast transmission path, and the second transmission stream is received via a network transmission path.

7. The reception device according to claim 1, wherein:
the first transmission stream includes an MPEG Media Transport (MMT) packet, and
the signaling information is included in a payload portion of the MMT packet.

8. A television reception method, comprising:
receiving first and second transmission streams that include signaling information and a plurality of components of content, the signaling information including component selection information that specifies a plurality of alternative presentations by identifying a set of alternative components from which the alternative presentations are formed, wherein the set of alternative components includes at least a first component included in the first transmission stream and at least a second component included in the second transmission stream;
causing display of a selection user interface on a display device based on the component selection information;

obtaining a user selection using the selection user interface; and causing a presentation from the plurality of alternative presentations to be presented based on the user selection.

9. The reception method according to claim 8, wherein:

the alternative components are associated with respective values of at least one attribute, and the selection user interface indicates the respective values of the at least one attribute.

10. The reception method according to claim 9, wherein the at least one attribute includes at least one of a view, a language, a video parameter, an audio parameter, a target region, a target device, a view title, an object, a composition type, a composition position, a path, a bit rate, or a robustness.

11. The reception method according to claim 8, wherein the component selection information includes:

adaptive layer information that specifies one of at least two atomic components, composite layer information that specifies the one of the plurality of alternative presentations as a combination of the at least two atomic components, and selective layer information that identifies the plurality of alternative presentations in association with a category identifier indicating the type of content to which the plurality of alternative presentations corresponds.

12. The reception method according to claim 8, wherein the signaling information includes acquisition location information for at least one of the plurality of components.

13. The reception method according to claim 8, wherein the first transmission stream is received via a broadcast transmission path, and the second transmission stream is received via a network transmission path.

14. The reception method according to claim 8, wherein:

the first transmission stream includes an MPEG Media Transport (MMT) packet, and the signaling information is included in a payload portion of the MMT packet.

* * * * *